US011452422B2

(12) United States Patent
Kim et al.

(10) Patent No.: US 11,452,422 B2
(45) Date of Patent: Sep. 27, 2022

(54) CLEANER AND CLEANING DEVICE HAVING THE SAME

(71) Applicant: SAMSUNG ELECTRONICS CO., LTD., Suwon-si (KR)

(72) Inventors: Tae Gwang Kim, Suwon-si (KR); Dong Hyun Lee, Hwaseong-si (KR); Won Kyu Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 213 days.

(21) Appl. No.: 16/462,702

(22) PCT Filed: Nov. 7, 2017

(86) PCT No.: PCT/KR2017/012542
§ 371 (c)(1),
(2) Date: May 21, 2019

(87) PCT Pub. No.: WO2018/093087
PCT Pub. Date: May 24, 2018

(65) Prior Publication Data
US 2019/0320864 A1   Oct. 24, 2019

Related U.S. Application Data

(60) Provisional application No. 62/424,837, filed on Nov. 21, 2016.

(30) Foreign Application Priority Data

Jun. 30, 2017   (KR) .................. 10-2017-0083459

(51) Int. Cl.
*A47L 9/24*   (2006.01)
*A47L 5/24*   (2006.01)
(Continued)

(52) U.S. Cl.
CPC ............. *A47L 9/248* (2013.01); *A47L 5/24* (2013.01); *A47L 9/102* (2013.01); *A47L 9/22* (2013.01);
(Continued)

(58) Field of Classification Search
CPC ... A47L 5/24; A47L 9/24; A47L 9/242; A47L 9/248; A47L 9/22; A47L 9/2878;
(Continued)

(56) References Cited

U.S. PATENT DOCUMENTS 4,403,373 A * 9/1983 Kummerlin ............... E06C 1/32
16/326
4,407,045 A * 10/1983 Boothe ............... E05D 11/1007
403/92
(Continued)

FOREIGN PATENT DOCUMENTS

CN   1608569 A   4/2005
EP   1764021 A1 * 3/2007   ............ A47L 9/009
(Continued)

OTHER PUBLICATIONS

European Search Report dated Sep. 5, 2019 in related European Patent Application No. 17872802.8.
(Continued)

*Primary Examiner* — Joseph J Hail
*Assistant Examiner* — Jonathan R Zaworski
(74) *Attorney, Agent, or Firm* — Staas & Halsey LLP

(57) ABSTRACT

A cleaner includes a first extension pipe connected to a suction portion contacting a surface to be cleaned, and a second extension pipe coupled to a cleaner body having a driver generating suction force, and rotatably coupled to the first extension pipe. The first and second extension pipes operate in a first arrangement configured to allow the second extension pipe to be arranged in a longitudinal direction of
(Continued)

the first extension pipe, and a second arrangement configured to allow the second extension pipe to rotate in a first direction from the first arrangement such that the first extension pipe and the second extension pipe are arranged to face each other. Such configuration enables a user to increase cleaning efficiency.

11 Claims, 20 Drawing Sheets

(51) Int. Cl.
    *A47L 9/22*           (2006.01)
    *A47L 9/28*           (2006.01)
    *A47L 9/10*           (2006.01)

(52) U.S. Cl.
    CPC ............... *A47L 9/242* (2013.01); *A47L 9/28* (2013.01); *A47L 9/2878* (2013.01); *A47L 9/2894* (2013.01)

(58) Field of Classification Search
    CPC .......... A47L 9/2894; A47L 9/28; A47L 9/102; F16L 27/0861; F16L 3/01; F16L 3/015; F16L 3/1075; F16L 47/18; F16C 11/10; E05D 11/1007; E05D 2011/1092
    USPC ................. 15/414; 16/319–353; 403/91–102
    See application file for complete search history.

(56) References Cited

U.S. PATENT DOCUMENTS

| | | | | |
|---|---|---|---|---|
| 4,540,202 A * | 9/1985 | Amphoux | ............... | F16L 3/015 403/111 |
| 4,566,150 A * | 1/1986 | Boothe | ............... | E06C 1/32 16/349 |
| 4,666,328 A * | 5/1987 | Ryu | ............... | E06C 1/32 403/92 |
| 4,697,305 A * | 10/1987 | Boothe | ............... | E06C 1/32 16/349 |
| 4,890,950 A * | 1/1990 | Yoo | ............... | F16C 11/10 182/163 |
| 5,039,118 A * | 8/1991 | Huang | ............... | B62B 9/20 403/96 |
| 5,123,768 A * | 6/1992 | Franklin | ............... | F16C 11/10 403/96 |
| 5,358,352 A * | 10/1994 | Klarhorst | ............... | F21V 21/26 403/267 |
| 5,542,151 A * | 8/1996 | Stranski | ............... | A47D 13/063 16/329 |
| 5,954,157 A * | 9/1999 | Grimes | ............... | E06C 1/32 16/329 |
| 6,343,406 B1 * | 2/2002 | Yeh | ............... | E06C 1/32 182/163 |
| 6,503,018 B2 * | 1/2003 | Hou | ............... | B62B 9/20 403/104 |
| 6,711,780 B2 * | 3/2004 | Lee | ............... | E06C 1/32 16/334 |
| 7,093,321 B2 * | 8/2006 | Burbrink | ............... | E06C 1/32 182/163 |
| D562,669 S * | 2/2008 | Kipperman | ............... | D8/323 |
| 7,617,569 B2 * | 11/2009 | Liao | ............... | E06C 1/32 16/334 |
| 8,341,806 B2 * | 1/2013 | Parker | ............... | A47C 12/00 16/349 |
| 8,500,147 B2 * | 8/2013 | Johnson | ............... | B62K 3/002 280/87.041 |
| 8,898,862 B1 * | 12/2014 | McGrath | ............. | E05D 11/1007 16/334 |
| 9,566,995 B2 * | 2/2017 | Strauss | ............... | F16C 11/00 |
| 2005/0081326 A1 * | 4/2005 | Jeon | ............... | A47L 9/242 15/414 |
| 2006/0156510 A1 * | 7/2006 | Park | ............... | A47L 9/009 15/414 |
| 2009/0283382 A1 * | 11/2009 | Hedlund | ............. | F16L 27/0857 192/70.22 |
| 2012/0086200 A1 * | 4/2012 | Hedlund | ............. | F16L 27/0845 285/185 |
| 2014/0237756 A1 * | 8/2014 | Conrad | ............... | A47L 9/327 15/329 |
| 2017/0112343 A1 * | 4/2017 | Innes | ............... | A47L 9/24 |

FOREIGN PATENT DOCUMENTS

| | | | |
|---|---|---|---|
| EP | 1764021 A1 | 3/2007 | |
| JP | 03-267032 | 11/1991 | |
| JP | 2004321699 A * | 11/2004 | |
| JP | 2005-95655 | 4/2005 | |
| JP | 2011-224224 A | 11/2011 | |
| JP | 2014-045870 | 3/2014 | |
| JP | 2014-45870 | 3/2014 | |
| JP | 2015-042320 | 3/2015 | |
| JP | 2015-42320 | 3/2015 | |
| JP | 2016-43208 | 4/2016 | |
| JP | 2016-043208 | 4/2016 | |
| KR | 10-2005-0059573 | 6/2005 | |
| KR | 10-2007-0037179 | 4/2007 | |
| KR | 10-0730948 | 4/2007 | |
| WO | WO-2012139488 A1 * | 10/2012 | ............. A47L 9/244 |

OTHER PUBLICATIONS

Chinese Office Action dated Sep. 8, 2020 in Chinese Patent Application No. 201780072034.3.
International Search Report dated Feb. 26, 2018 in corresponding International Application No. PCT/KR2017/012542.
Written Opinion of the International Searching Authority dated Feb. 26, 2018 in corresponding International Application No. PCT/KR2017/012542.
Chinese Office Action dated Apr. 19, 2021 in Chinese Patent Application No. 201780072034.3.
Korean Office Action dated May 5, 2021 in Korean Patent Application No. 10-2017-0083459.
National Intellectual Property Administration, PRC issued a Decision of Rejection in Chinese Application No. 201780072034.3 dated Aug. 3, 2021.
Korean Patent Office issued a Notice of Allowance in Korean Application No. 10-2017-0083459 dated Aug. 2, 2021.

* cited by examiner

CLEANER AND CLEANING DEVICE HAVING THE SAME

CROSS-REFERENCE TO RELATED APPLICATIONS

This application is a U.S. National Stage Application which claims the benefit under 35 U.S.C. § 371 of International Patent Application No. PCT/KR2017/012542, filed on Nov. 7, 2017, which claims the benefit of U.S. Provisional Application No. 62/424,837, filed on Nov. 21, 2016, which claims foreign priority benefit under 35 U.S.C. § 119 of Korean Patent Application No. 10-2017-0083459 filed on Jun. 30, 2017 in the Korean Intellectual Property Office, the contents of all of which are incorporated herein by reference.

TECHNICAL FIELD

Embodiments of the present disclosure relate to a cleaner and a cleaning device having the same, and more specifically to a cleaner having improved cleaning efficiency and a cleaning device having the same.

BACKGROUND ART

In general, a vacuum cleaner is a household appliance that suctions air containing foreign materials such as dust using vacuum pressure generated by a motor mounted inside a main body of the vacuum cleaner, and filters the foreign materials from the suctioned air in the main body.

In more detail, the vacuum cleaner basically includes a motor to generate suction pressure, a suction portion to be in contact with a surface to be cleaned, and an air passage to connect the motor to the suction portion. The air passage may be provided in various ways according to types of the vacuum cleaner.

For example, vacuum cleaners may be classified into a stick-type (upright-type) cleaner and a canister-type cleaner. The canister-type cleaner may be configured to have an extension pipe extending between a suction portion and a handle. Through the above configuration, the canister-type cleaner may allow a suction portion embedded therein to be in contact with the surface to be cleaned without requiring a user to bend down, thereby cleaning the surface to be cleaned.

However, in order to clean a lower space of furniture such as a bed or a couch using such a cleaner, the user needs to perform cleaning by putting the suction portion of the cleaner into a space below the furniture in a state wherein the user bends his or her waist or lowers his or her posture. Therefore, the user may experience discomfort when using the cleaner. In addition, the vacuum cleaner has a longer extension pipe extending from the suction portion as compared to the main body, thereby making it difficult to keep or store the vacuum cleaner.

DISCLOSURE

Technical Problem

It is an object of the present disclosure to provide a cleaner having an improved extension pipe.

It is another object of the present disclosure to provide a cleaner that is easy to store.

It is another object of the present disclosure to provide a cleaner having improved user convenience.

Technical Solution

The objects of the present disclosure can be achieved by a cleaner including a first extension pipe connected to a suction portion contacting a surface to be cleaned, and a second extension pipe coupled to a cleaner body having a driver generating suction force, and rotatably coupled to the first extension pipe. The first and second extension pipes may operate in a first arrangement and a second arrangement. The first arrangement may allow the second extension pipe to be arranged in a longitudinal direction of the first extension pipe. The second arrangement may allow the second extension pipe to rotate in a first direction from the first arrangement such that the first extension pipe and the second extension pipe are arranged to face each other.

The first and second extension pipes may further operate in a third arrangement configured to rotate in a second direction opposite to the first direction from the first arrangement.

The cleaner may further include a link assembly configured to allow the second extension pipe to rotate about the first extension pipe.

The link assembly may include a locking device configured to restrict or release rotation of the first and second extension pipes.

The locking device may include a locking button configured to be pressurized, a stopper pressurized by the locking button, and a stopper receiver configured to allow the stopper to be inserted therein such that rotation of the second extension pipe is restricted, or configured to allow the stopper to be released therefrom such that restriction of the rotation of the second extension pipe is released.

The locking button may have a pressurization direction perpendicular to the first and second directions.

The link assembly may include a stopper seating portion configured to extend from any one of the first and second extension pipes, and provided to allow the stopper to be seated therein such that movement of the stopper is restricted in the pressurization direction, and a receiver seating portion configured to extend from the other one of the first and second extension pipes such that the stopper receiver is fixedly disposed therein.

The link assembly may further include a stopper elastic member configured to allow the stopper to elastically return in a direction opposite to the pressurization direction.

The locking button may be one pair of locking buttons, the stopper may be one pair of stoppers, and the stopper receiver may be one pair of stopper receivers. The locking device may include a rotation shaft configured to interconnect the one pair of the stopper receivers as well as to form a rotation center of each of the first and second extension pipes.

The rotation shaft may be spaced apart from an inner passage of each of the first and second extension pipes.

The one pair of stoppers may include one pair of insertion protrusions vertically spaced apart from the rotation shaft, and inserted into the stopper receiver.

The one pair of insertion protrusions may be arranged in a direction perpendicular to a longitudinal direction of any one of the first and second extension pipes.

The cleaner may further include a flexible hose provided between the first and second extension pipes so as to interconnect inner passages of the first and second extension pipes, and configured to have a variable length according to arrangements of the first and second extension pipes.

The flexible hose may be arranged in a longitudinal direction of each of the first and second extension pipes in the first arrangement.

In accordance with another aspect of the present disclosure, a cleaning device includes a suction portion configured to suction air including dust or foreign materials, a first extension pipe coupled to the suction portion, a second extension pipe coupled to a cleaner body having a driver generating suction force, and a link assembly configured to allow the second extension pipe to rotate about the first extension pipe. In association with a first arrangement in which the first and second extension pipes are arranged in the same direction, the link assembly may be configured in a manner that the second extension pipe rotates either in a first direction about the first extension pipe or in a second direction opposite to the first direction about the first extension pipe.

The first and second extension pipes may be configured to operate in a second arrangement and a third arrangement. The second arrangement may allow the second extension pipe from the first arrangement to rotate in the first direction about the first extension pipe such that the first and second extension pipes are arranged to face each other. The third arrangement may allow the second extension pipe from the first arrangement to rotate in the second direction opposite to the first direction about the first extension pipe.

The first and second extension pipes may be configured in a manner that the second extension pipe from the first arrangement rotates in the first direction about the first extension pipe, such that the first and second extension pipes may be spaced apart from each other by a first angle. Alternatively, the first and second extension pipes may be configured in a manner that the second extension pipe from the first arrangement rotates in the second direction about the first extension pipe, such that the first and second extension pipes are spaced apart from each other by a second angle.

The first angle may be represented by the following expression ($0° \leq$ First Angle $< 180°$).

The second angle may be represented by the following expression ($120° \leq$ Second Angle $< 180°$)

In accordance with another aspect of the present disclosure, a cleaning device includes a cleaner and a mounting station. The cleaner includes a first extension pipe and a second extension pipe rotatably coupled to the first extension pipe. The cleaner may be configured to operate in a first arrangement, a second arrangement, and a third arrangement. In the first arrangement, the first and second extension pipes are arranged in the same direction while being formed in a long straight line. In the second arrangement, the first and second extension pipes may be folded in a first direction from the first arrangement, and may be arranged parallel to each other. In the third arrangement, the first and second extension pipes may be folded in a second direction opposite to the first direction from the first arrangement. The mounting station may be mounted to the cleaning device when the cleaner is in the second arrangement.

Advantageous Effects

As is apparent from the above description, the cleaner according to the embodiments of the present disclosure may improve a structure of an extension pipe, and may be freely modified in structure according to use purposes thereof.

The extension pipe of the cleaner according to the embodiments of the present disclosure may be folded and stored, such that a storage space of the cleaner can be minimized in size and space utilization of the cleaner can be improved.

The cleaner according to the embodiments of the present disclosure may prevent reduction of suction force or loss of intake air.

The cleaner according to the embodiments of the present disclosure may have an aesthetically pleasing appearance.

MODES OF THE INVENTION

Figure 1:
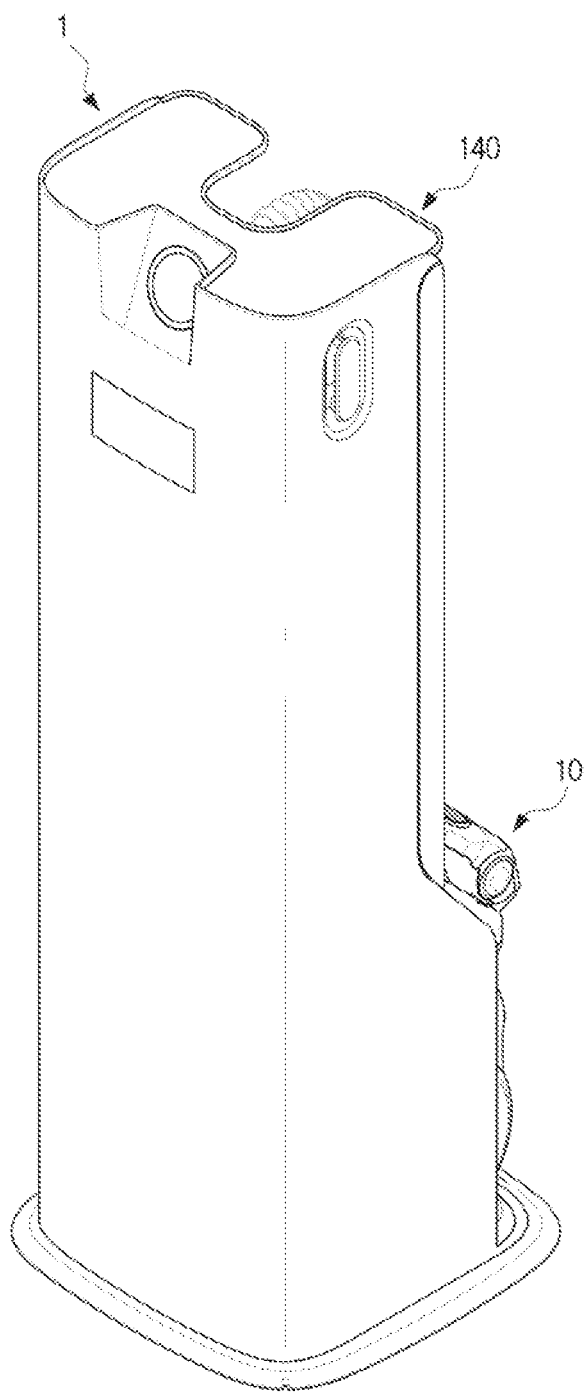
FIGS. 1 and 2 are perspective views illustrating a cleaning device according to an embodiment of the present disclosure.

Reference will now be made in detail to the embodiments of the present disclosure, examples of which are illustrated in the accompanying drawings, wherein like reference numerals refer to like elements throughout.

In addition, the same reference numbers or symbols disclosed in the drawings of the present disclosure may represent parts or components which perform substantially the same function.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

A cleaner and a cleaning device having the same according to the embodiments of the present disclosure will hereinafter be described with reference to the attached drawings.

Figure 2:
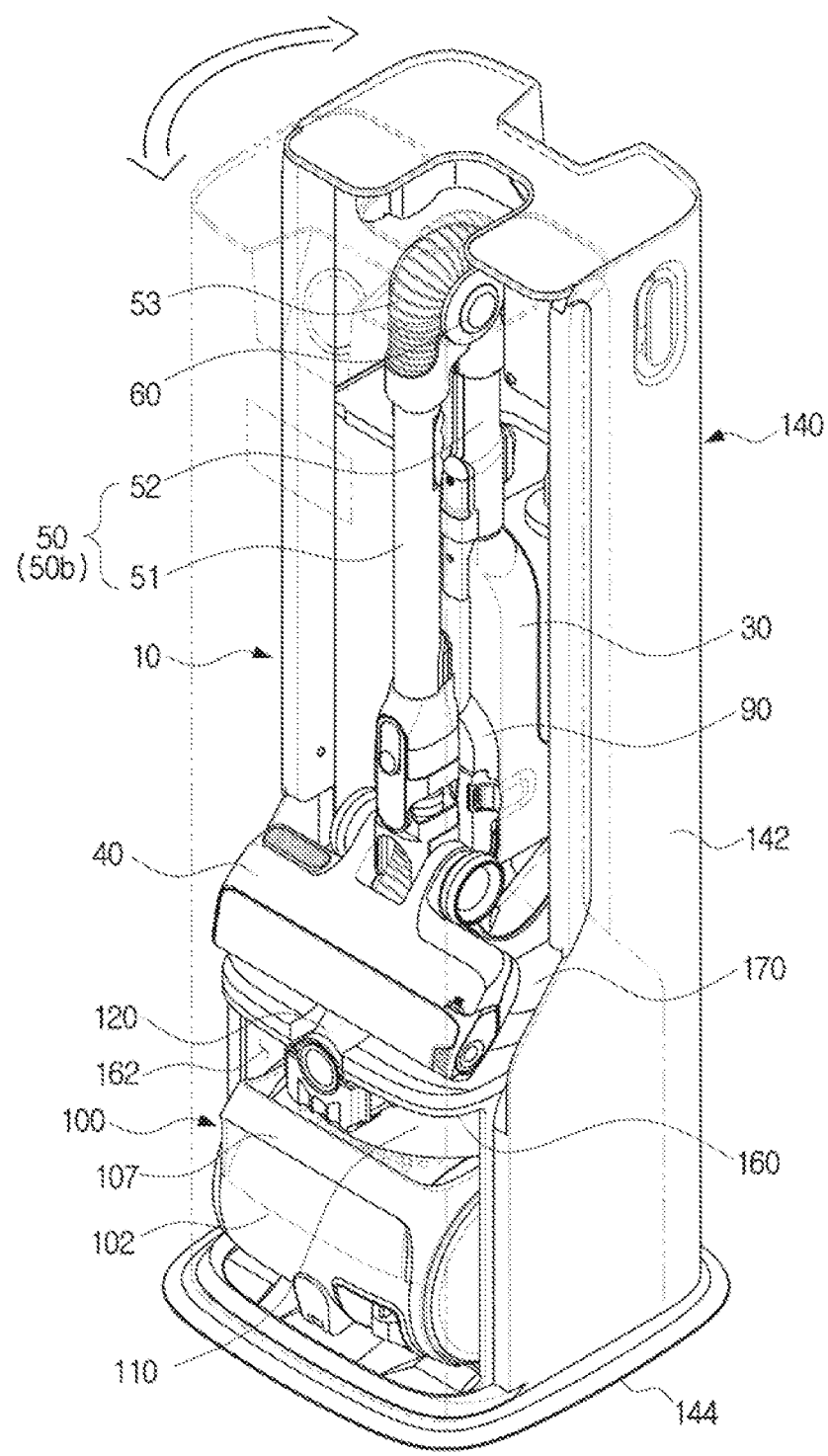
Figure 3:
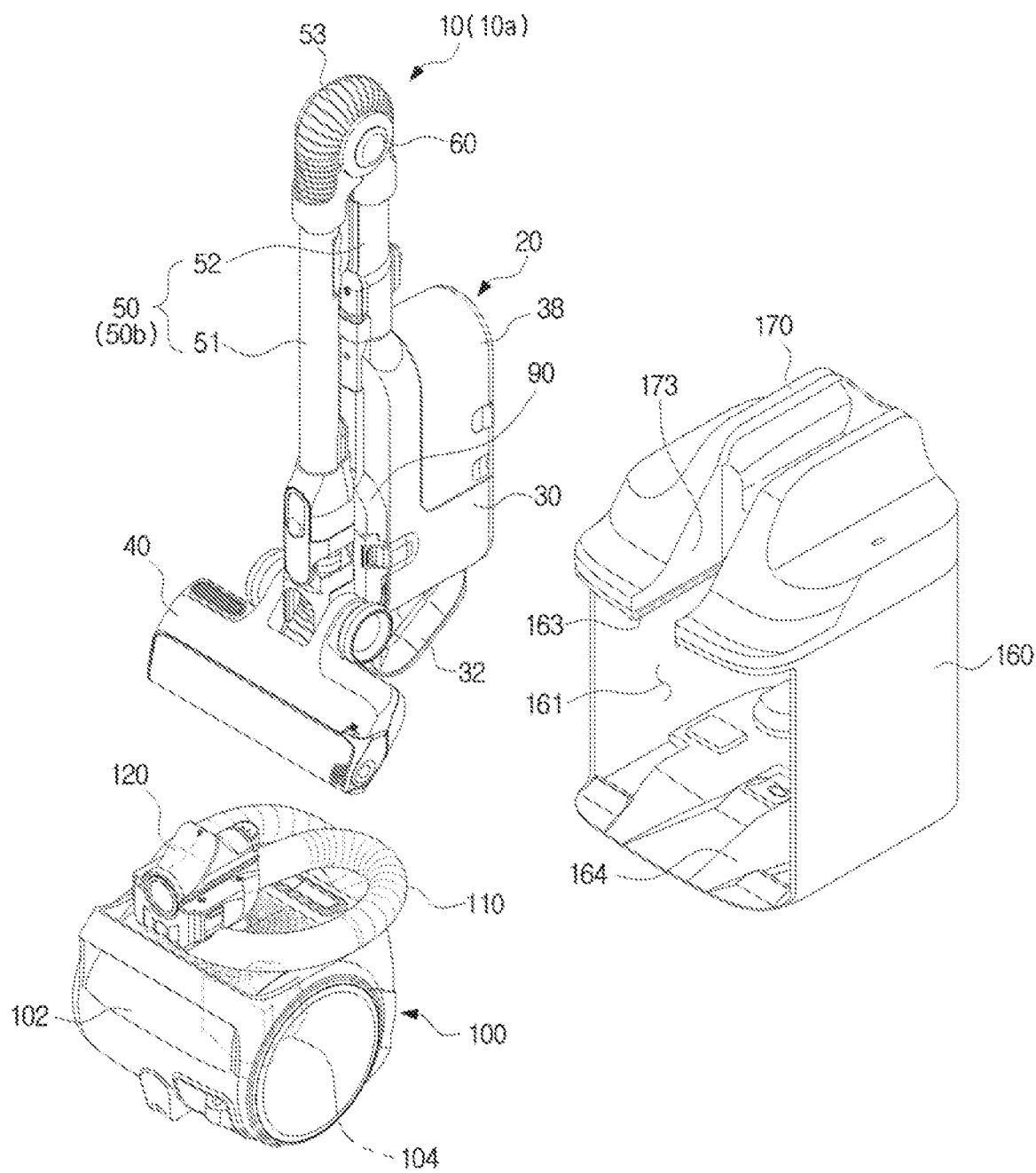
FIG. 3 is an exploded perspective view illustrating the cleaning device according to an embodiment of the present disclosure.
Figure 4:
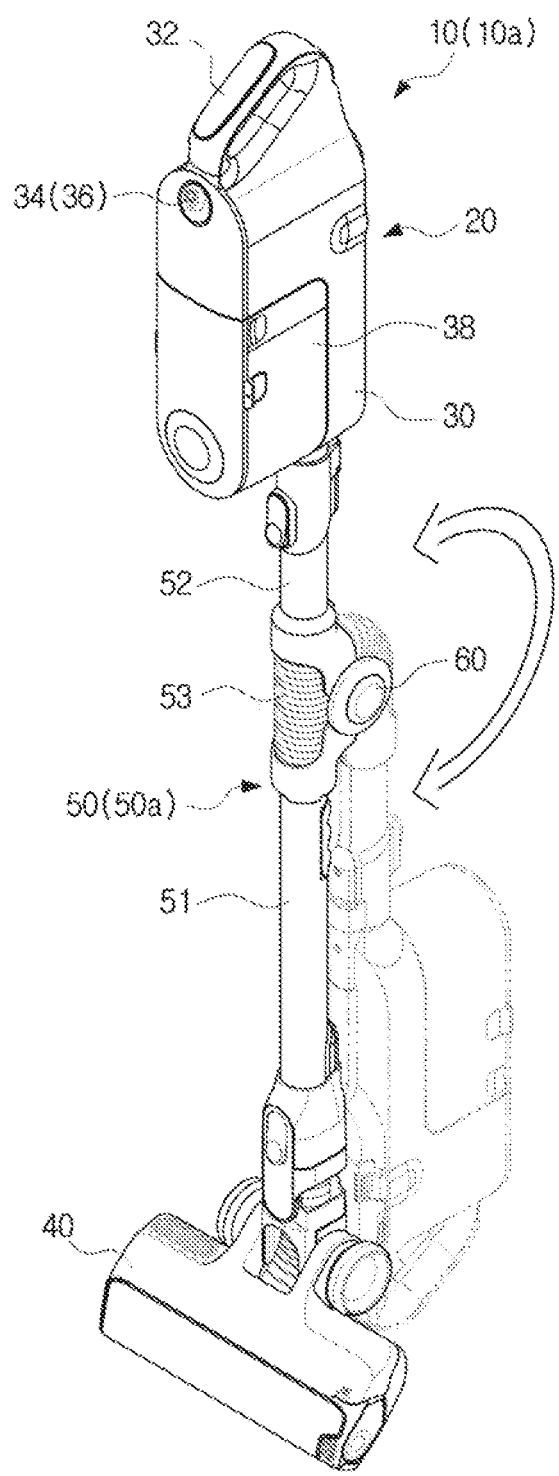
FIG. 4 is a perspective view illustrating a cleaner according to an embodiment of the present disclosure.
Figure 5A:
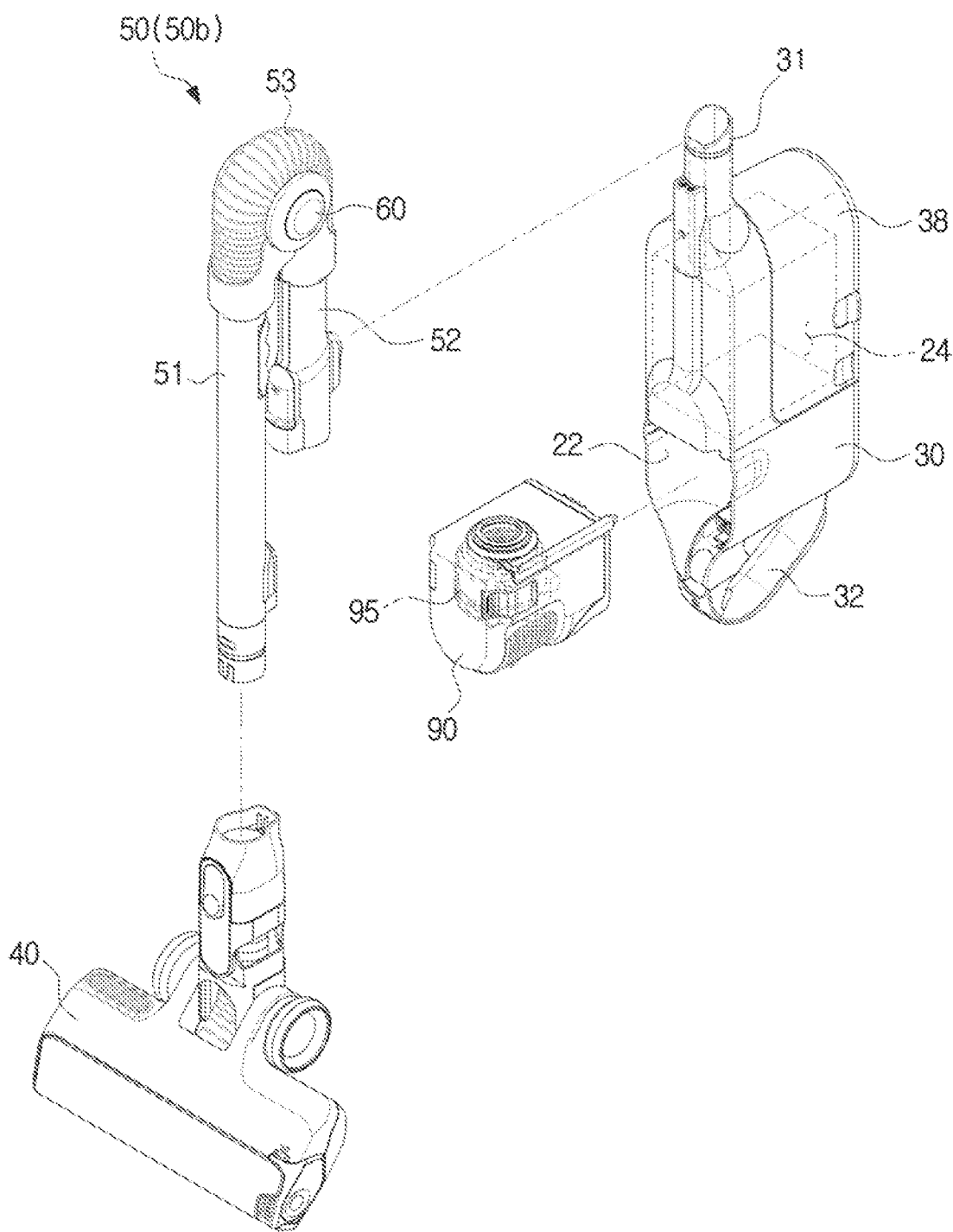
FIG. 5A is a perspective view illustrating a cleaning device operating in a wireless cleaning mode according to an embodiment of the present disclosure.
Figure 5B:
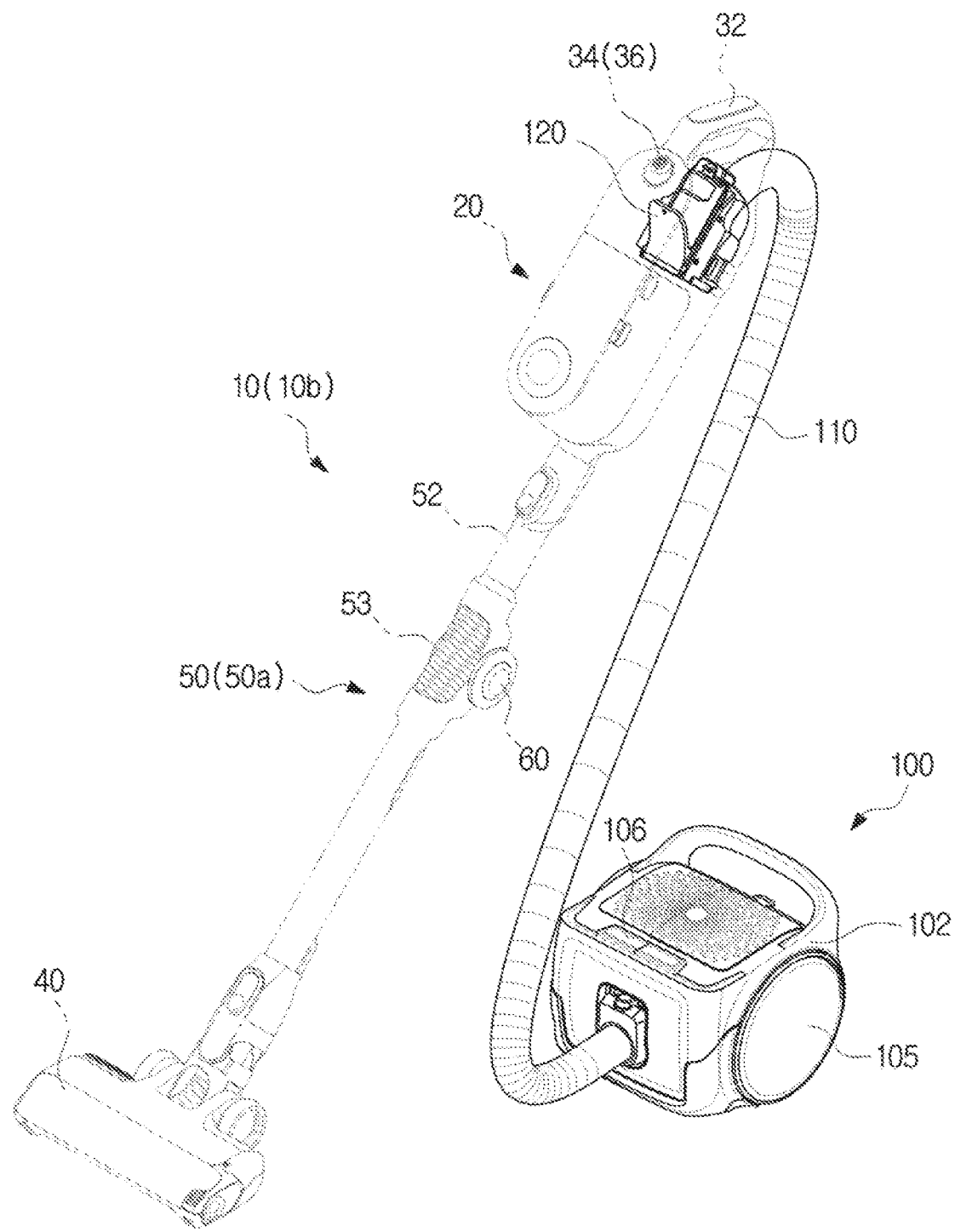
FIG. 5B is a perspective view illustrating a cleaning device operating in a wired cleaning mode according to an embodiment of the present disclosure.

FIGS. 1 and 2 are perspective views illustrating a cleaning device according to an embodiment of the present disclosure. FIG. 3 is an exploded perspective view illustrating the cleaning device according to an embodiment of the present disclosure. FIG. 4 is a perspective view illustrating a cleaner according to an embodiment of the present disclosure. FIG. 5A is a perspective view illustrating a cleaning device operating in a wireless cleaning mode according to an embodiment of the present disclosure. FIG. 5B is a perspective view illustrating a cleaning device operating in a wired cleaning mode according to an embodiment of the present disclosure.

The cleaning device 1 may include a cleaner 10 and a mounting station 140.

The mounting station 140 may be configured in a manner that the cleaner 10 can be stored or charged with electricity. The mounting station 140 will hereinafter be described with reference to the attached drawings.

The cleaner 10 may include a wireless cleaning mode 10a and a wired cleaning mode 10b (see FIG. 5B).

The cleaner 10 may include a cleaner module 20, a wireless cleaning module 90 for the wireless cleaning mode 10a, and a wired cleaning module 100 for the wired cleaning mode 10b.

The cleaner 10 may be used as a wireless cleaner by combining the cleaner module 20 with the wireless cleaning module 90, and may be used as a wired cleaner by combining the cleaner module 20 with the wired cleaning module 100. In more detail, the cleaner 10 may be used as a wired cleaner by combining the cleaner module 20 with a connector 120 of the cleaner module 20.

The cleaner module 20 may include a module mounting portion 22 (see FIG. 5A).

The wireless cleaning module 90 may be connected to an inner passage 24 formed in the cleaner module 20, and may include a driver to generate suction force. The driver may include a first suction motor 95.

The wired cleaning module 100 may include a canister 102, a connection hose 110 for coupling the canister 102 to the cleaner module 20, and a connector 120 provided in the connection hose 110 and detachably coupled to the cleaner module 20. The canister 102 may include a driver. The driver may include a second suction motor (not shown). The canister 102 may include a display 106. The display 106 may display information about a current cleaning situation or the like.

The wireless cleaning module 90 or the connector 120 of the wired cleaning module 100 may be mounted to the module mounting portion 22 of the cleaner module 20, such that the wireless cleaning mode 10a or the wired cleaning mode may start operation. For convenience of description, the wireless cleaner 10 will hereinafter be described in detail, and will hereinafter be referred to as a cleaner 10.

The cleaner 10 may include a cleaner body 30 and a suction portion 40.

The cleaner body 30 may be grasped by the user such that the user can easily operate and manipulate the cleaner 10.

The cleaner body 30 may include a handle portion 32 and a manipulation portion 34. The user may grasp and clean the handle portion 32. The user may manipulate a power button 36 or the like provided in the manipulation portion 34, such that the user may turn the cleaner 10 on or off or may adjust strength of suction force.

The suction portion 40 may be provided to be in contact with a surface to be cleaned. The suction portion 40 will hereinafter be referred to as a head unit. The suction portion 40 may be in contact with the surface to be cleaned, and may allow dust or contaminants of the surface to be cleaned to be introduced into the cleaner 10 using suction force generated by the suction motor 95.

The cleaner body 30 may include a dust collection device 38. The dust collection device 38 may be arranged upstream of air flow as compared to the suction motor 95, such that the dust collection device 38 may filter and collect dust or contaminants from the air introduced from the suction portion 40. The dust collection device 38 may be detachably provided in the cleaner body 30. The dust collection device 38 may be provided to filter out dust or foreign materials from the air introduced from the suction portion 40.

The cleaner 10 may include an extension pipe 50. One end of the extension pipe 50 may be connected to the cleaner body 30. In more detail, the extension pipe 50 may be connected to a suction pipe 31 of the cleaner body 30. The other end of the extension pipe 50 may be connected to the suction portion 40. The extension pipe 50 may be pivotably connected to the suction portion 40, such that the extension pipe 50 can perform joint movement.

The extension pipe 50 may be provided to allow dust or contaminants suctioned from the suction portion 40 to be introduced into the dust collection device 38. When the user cleans a floor, the extension pipe 50 may allow the suction portion 40 to be in contact with the floor without requiring the user to bend down.

The mounting station 140 may include a cabinet 142 forming the external appearance thereof, a canister cabinet 160 arranged in the cabinet 142, and a cleaner mounting portion 170.

At least one side of the cabinet 142 may be opened so that the cleaner 10 can be stored in the cabinet 142. One open side of the cabinet 142 may be opened or closed by a door (not shown), such that the cleaner can be prevented from exposure. The mounting station 140 may include a support plate 144 that is located at a lower part of the cabinet 142 such that the cabinet 142 can rotate. As shown in FIG. 2, the cabinet 142 may rotate by 360° in one or another direction at an upper part of the support plate 144.

One end of the canister cabinet 160 may be opened so that the canister 202 of the wired cleaning module 200 is located in the canister cabinet 160.

The cleaner mounting portion 170 may be located over the canister cabinet 160, and may be detachably coupled to the canister cabinet 160. In addition, the canister cabinet 160 and the cleaner mounting portion 170 may be detachably coupled to the cabinet 142.

The canister cabinet 160 may include a guide groove 163, and the cleaner mounting portion 170 may include a guide groove 173. The guide grooves 163 and 173 may be formed to be coupled with the connector 120, or may be formed to allow the connection hose 110 to pass therethrough. Each guide groove may be arranged in the same direction as the open side of the canister cabinet 160.

The canister cabinet 160 may include an entrance inclined surface 164 formed on at least a portion of a bottom surface forming an insertion space 161 in which the canister 102 is mounted. The entrance inclined surface 164 may be formed to be tilted so that the canister 192 can be easily inserted into the insertion space 161.

The cabinet 142, the canister cabinet 160, the cleaner mounting portion 170, and the cleaner 10 may be electrically coupled to one another. In other words, since the mounting station 140 is electrically connected to the cleaner 10, the cleaner 10 can be charged with electricity by connecting to a power source.

The canister cabinet 160 may be configured to be higher than the canister 202. In other words, the canister cabinet 160 may include a hose storage space 162. The canister cabinet 160 may prevent the connection hose 110 connected to the canister 102 through the hose storage space 162 from being exposed outside the mounting station 140.

The canister 102 may include a canister handle portion 107 provided at one side thereof. The canister handle portion 107 may be provided at one side of a canister body. The user may move the canister 102 by grasping the canister handle portion 107. When the canister 102 is stored in the canister cabinet 160, the canister handle portion 107 may be configured to cover the hose storage space 162. As a result, when the canister 102 is seated in the canister cabinet 160, the connection hose 110 placed in the hose storage space 162 may not be exposed outside.

Figure 6:
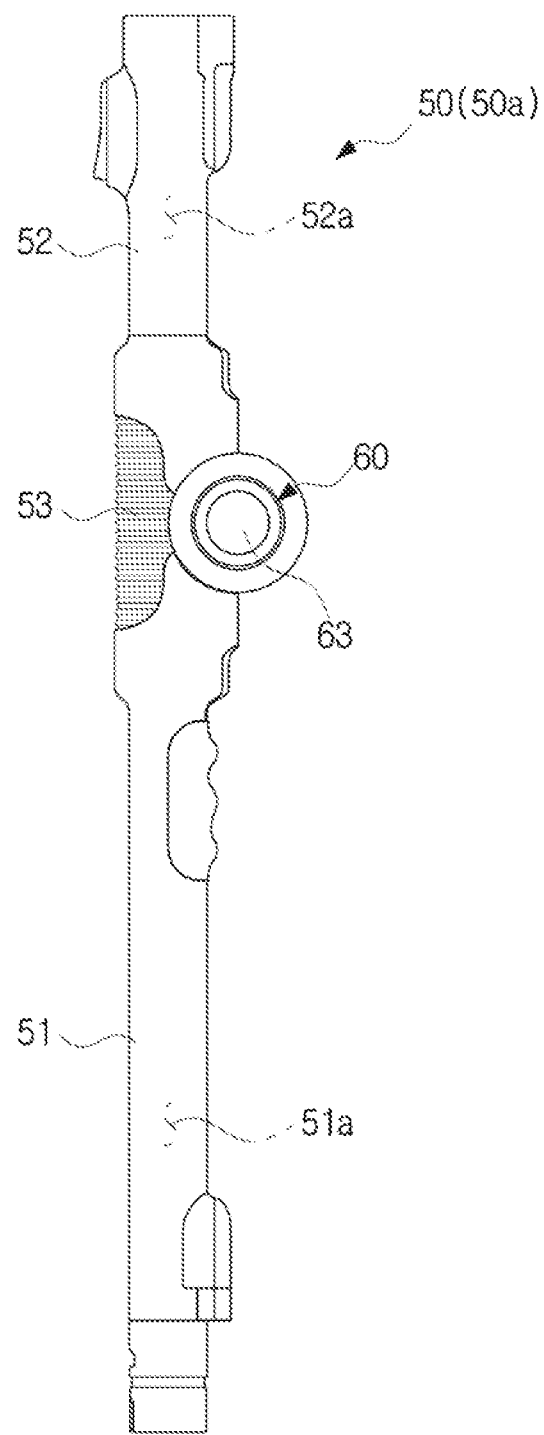
FIGS. 6 and 7 are views illustrating an extension pipe and a link assembly of the cleaner according to an embodiment of the present disclosure.
Figure 7:
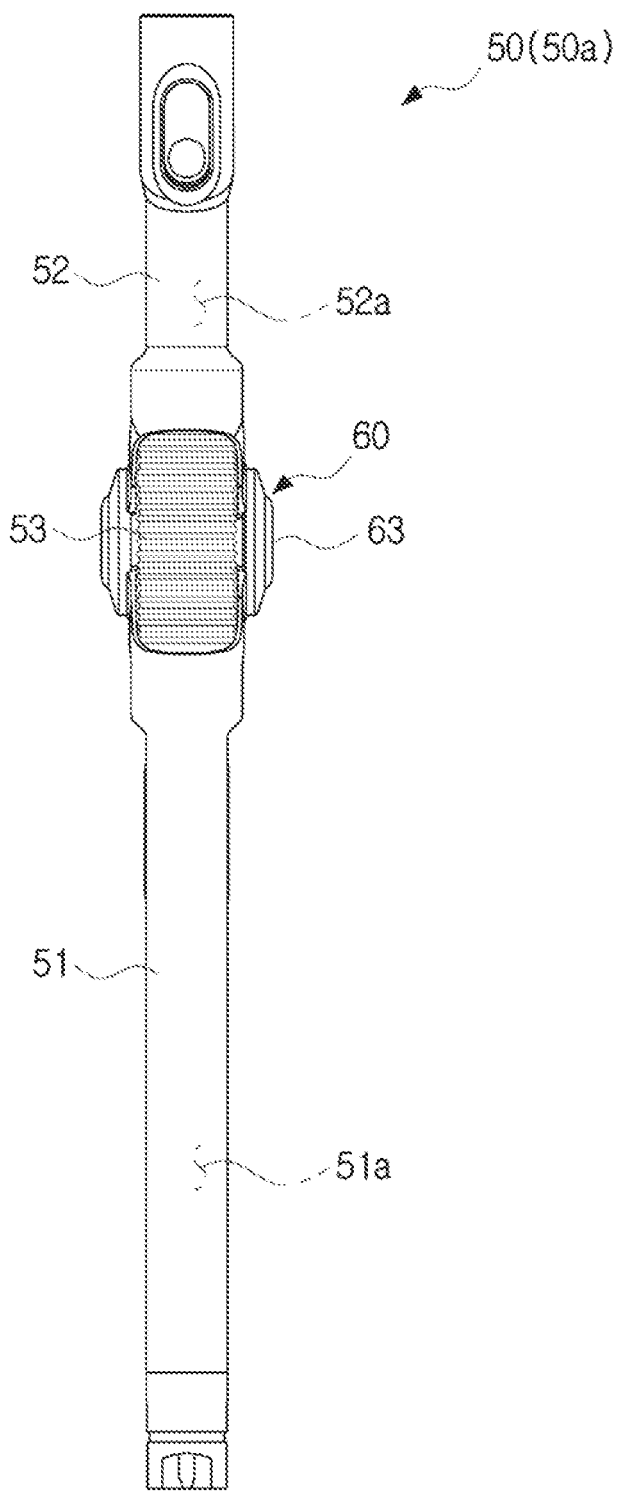
Figure 8:
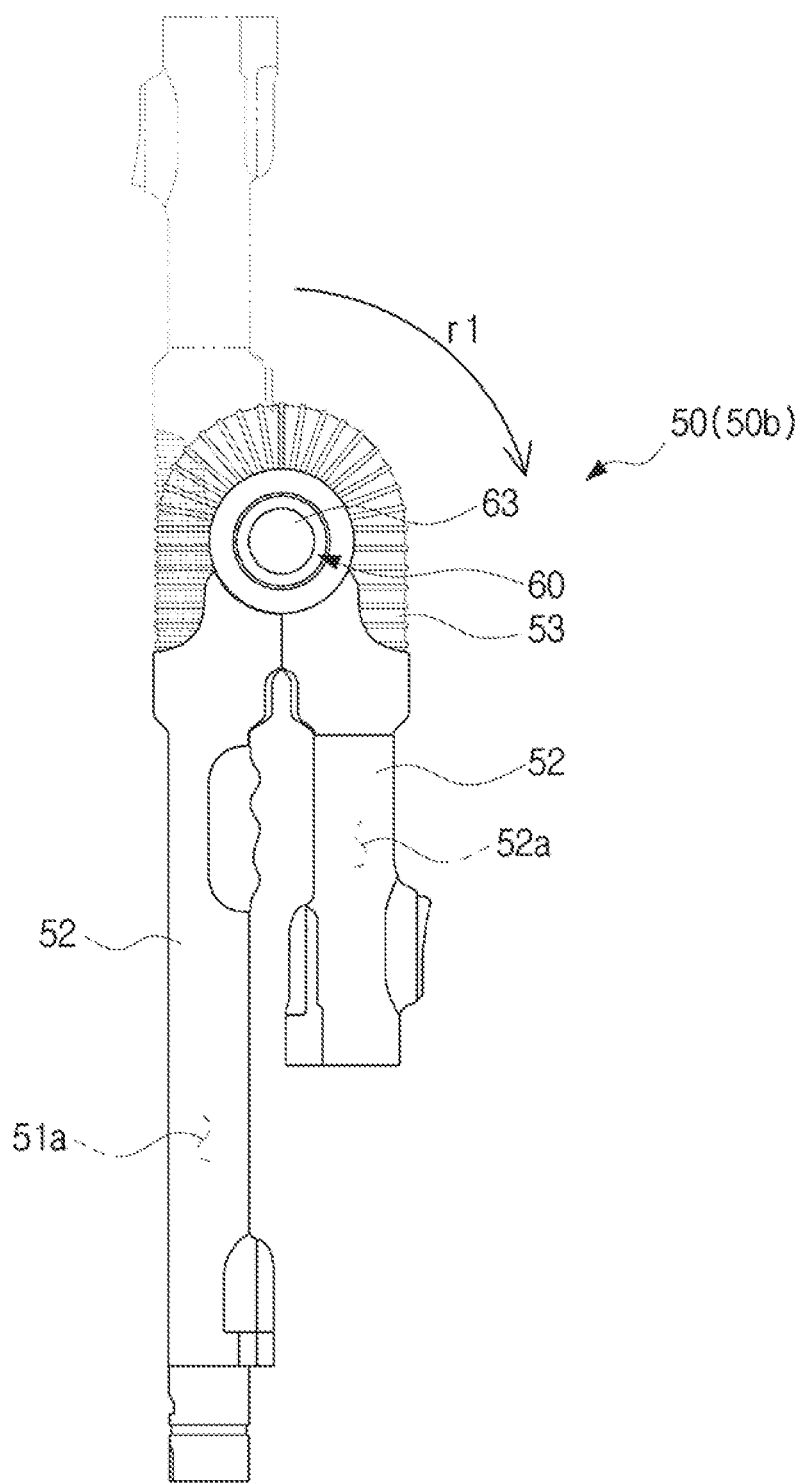
FIGS. 8 and 9 are views illustrating operations of the cleaner according to an embodiment of the present disclosure.
Figure 9:
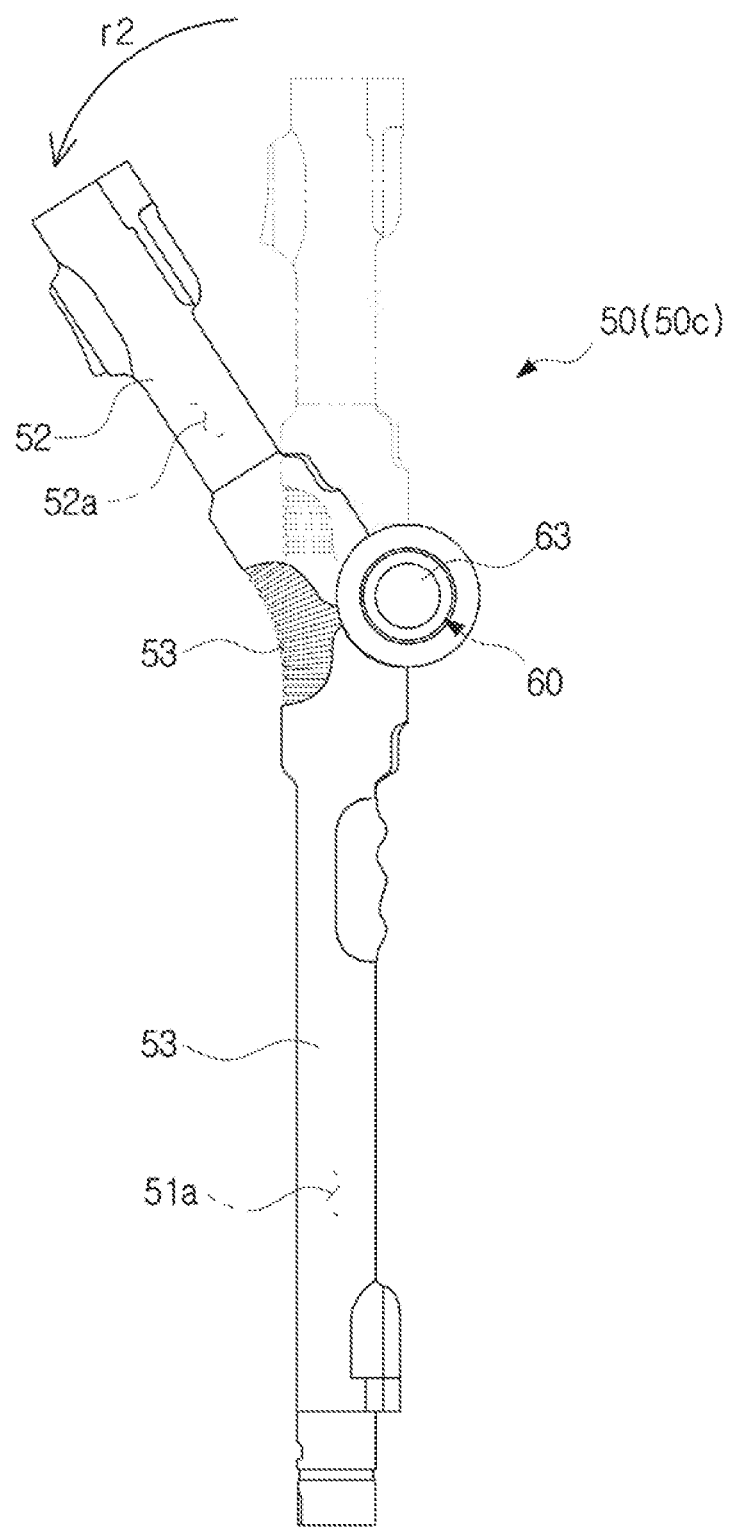

FIGS. 6 and 7 are views illustrating an extension pipe and a link assembly of the cleaner according to an embodiment of the present disclosure. FIGS. 8 and 9 are views illustrating operations of the cleaner according to an embodiment of the present disclosure.

The extension pipe 50 may be configured to interconnect the suction portion 40 and the cleaner body 30. The extension pipe 50 may be bent or folded at a predetermined angle. That is, the extension pipe 50 may be formed in a long straight line, and may have a joint structure such that a certain portion of the extension pipe 50 may be bent or folded through the joint structure.

The extension pipe 50 may include a first extension pipe 51 and a second extension pipe 52.

The first extension pipe 51 may be connected to the suction portion 40 contacting the surface to be cleaned.

The second extension pipe 52 may be connected to the cleaner body 30. The second extension pipe 52 may be provided to rotate with the first extension pipe 51. In other words, any one of the first and second extension pipes 51 and 52 may be provided to rotate about the other one of the first and second extension pipes 51 and 52.

The second extension pipe 52 may be provided to rotate in a first direction (r1) from the first extension pipe 51. For convenience of description, although the embodiment of the present disclosure has been disclosed using the first extension pipe 51 as an example, the first extension pipe 51 may also rotate about the second extension pipe 52 as necessary.

The second extension pipe 52 may rotate while being spaced apart from the first extension pipe 51 by a first angle. The first angle may be denoted by the following equation.

$$0° \leq \text{First Angle} < 180°$$

The second extension pipe 52 may be provided to rotate in a second direction (r2) opposite to the first direction (r1) from the first extension pipe 51. In other words, the second extension pipe 52 may be provided to rotate in the first or second direction r1 or r2 from the first extension pipe 51.

The second extension pipe 52 may rotate while being spaced apart from the first extension pipe 51 by a second angle. The second angle may be denoted by the following equation.

$$120° \leq \text{Second Angle} < 180°$$

In other words, the second extension pipe 52 may rotate in both directions from the first extension pipe 51. As a result, the cleaner may be modified in structure according to user needs.

The first and second extension pipes 51 and 52 may operate in first and second arrangements 50a and 50b.

The first arrangement 50A may be configured in a manner that each of the first and second extension pipes 51 and 52 may be arranged in a long straight line. That is, the second extension pipe 52 may be arranged in a longitudinal direction of the first extension pipe 51. An angle between the first extension pipe 51 and the second extension pipe 52 may be set to 180 degrees.

In the second arrangement 50b, the second extension pipe 52 may rotate in the first direction (r1) from the first arrangement 50a, such that the first extension pipe 51 and the second extension pipe 52 may be arranged to face each other. The second arrangement 50 may be folded in a manner that the first and second extension pipes 51 and 52 may be arranged parallel to each other. In other words, the angle between the first extension pipe 51 and the second extension pipe 52 may be set to zero.

The first and second extension pipes 51 and 52 may be configured to operate in a third arrangement 50c.

In the third arrangement 50c, the second extension pipe 52 may rotate in the second direction (r2) from the first arrangement 50a, such that a predetermined angle may be formed between the first extension pipe 51 and the second extension pipe 52. Here, the predetermined angle may be 120 degrees.

The extension pipe 50 may include a flexible hose 53.

The flexible hose 53 may be disposed between the first extension pipe 51 and the second extension pipe 52 such that an inner passage 51a of the first extension pipe 51 can be connected to an inner passage 52a of the second extension pipe 52. The flexible hose 53 may be configured to contract or relax. When the second extension pipe 52 rotates in the first or second direction, the flexible hose 52 may be configured to be bendable. As a result, although the second extension pipe 52 rotates in the first or second direction r1 or r2, the inner passage 51a of the first extension pipe 51 and the inner passage 52a of the second extension pipe 52 may be prevented from being disconnected from each other.

Figure 10:
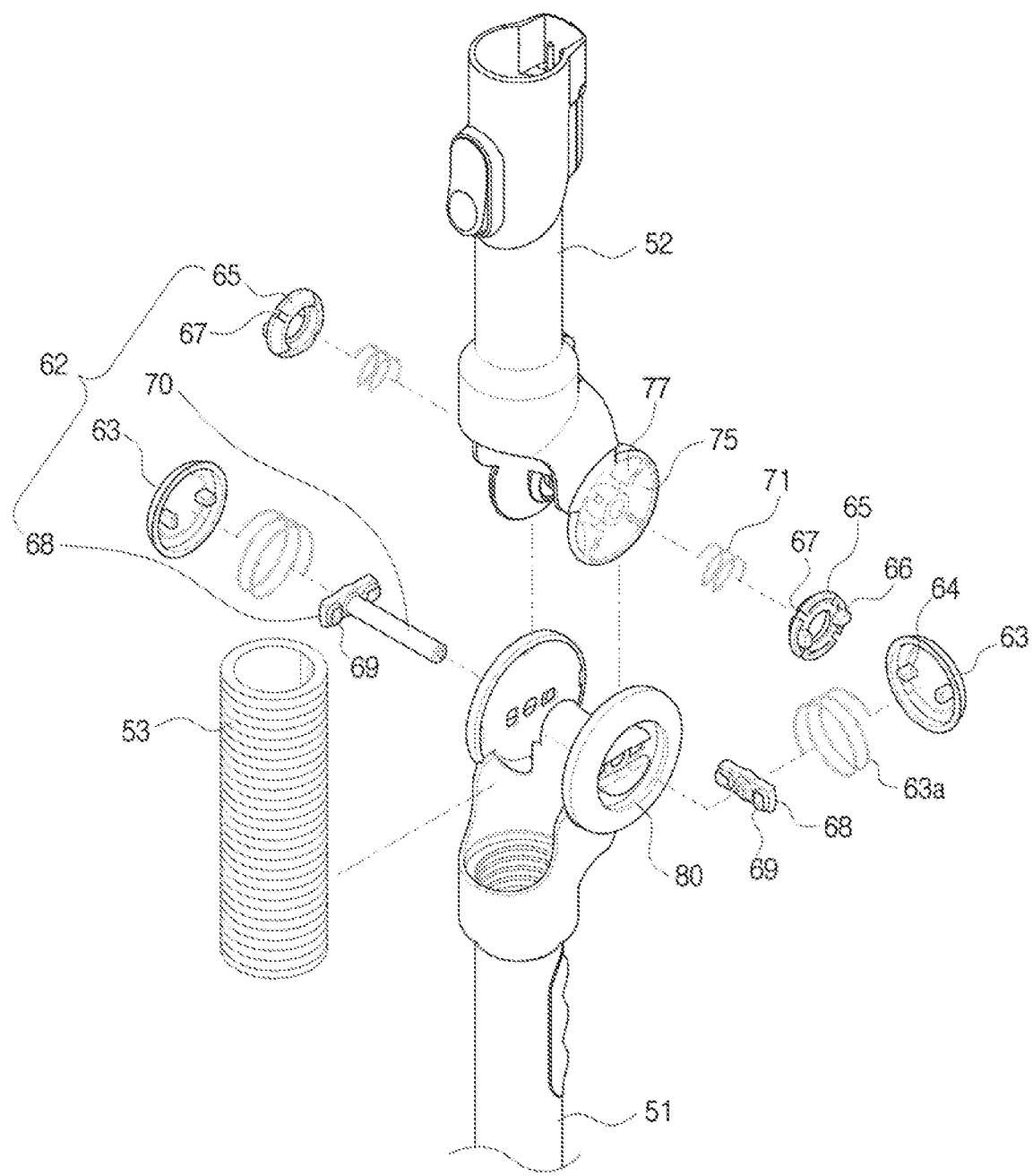
FIG. 10 is an exploded perspective view illustrating the link assembly and the extension pipe of the cleaner according to an embodiment of the present disclosure.
Figure 11:
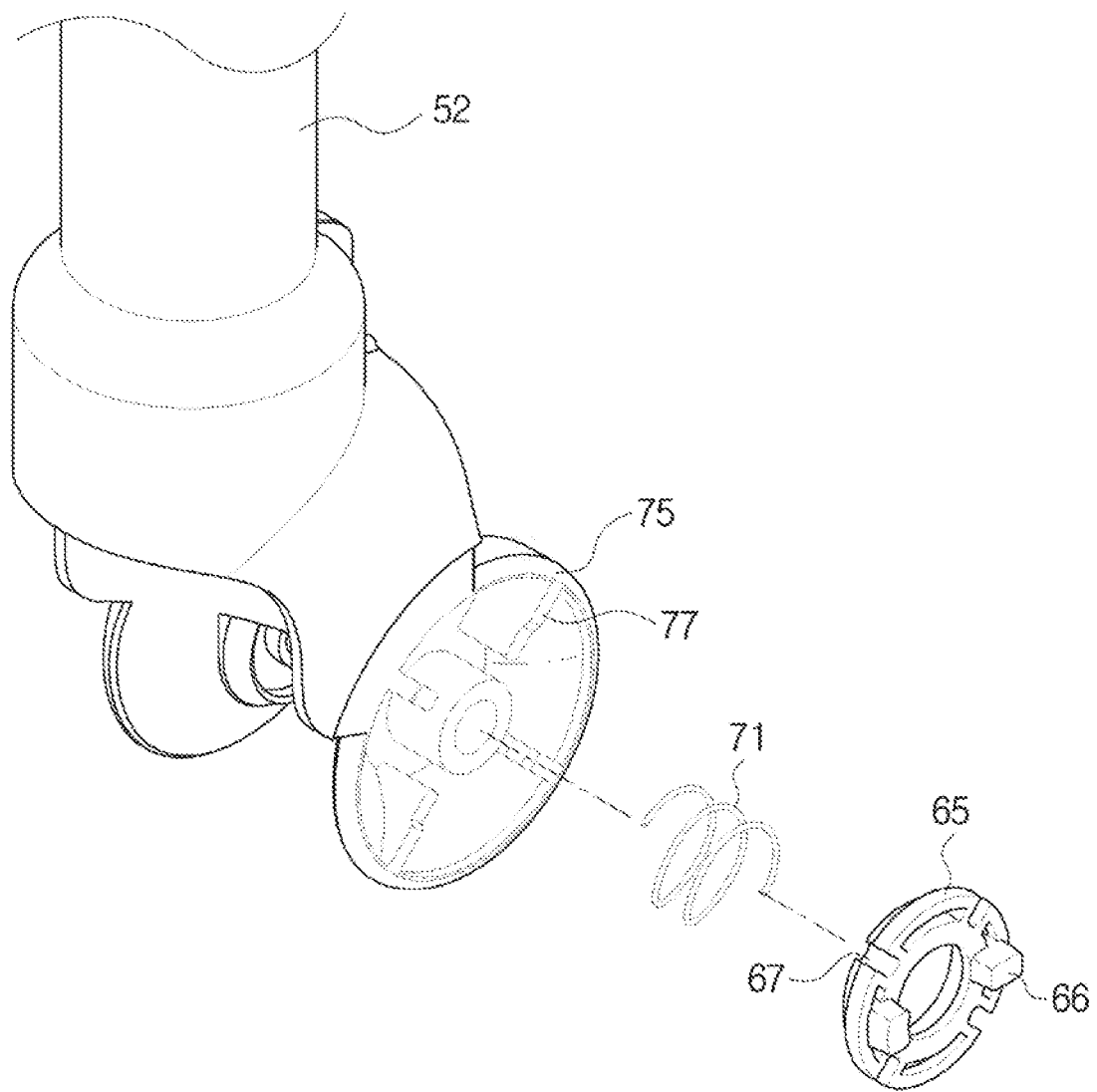
FIG. 11 is an exploded perspective view illustrating one example of the link assembly of the cleaner according to an embodiment of the present disclosure.

FIG. 10 is an exploded perspective view illustrating the link assembly and the extension pipe of the cleaner according to an embodiment of the present disclosure. FIG. 11 is an exploded perspective view illustrating one example of the link assembly of the cleaner according to an embodiment of the present disclosure.

The extension pipe 50 may include a link assembly 60.

The link assembly 60 may be disposed between the first extension pipe 51 and the second extension pipe 52. The link assembly 60 may be configured in a manner that any one of the first and second extension pipes 51 and 52 can rotate about the other one of the first and second extension pipes 51 and 52. The link assembly 60 may be configured in a manner that the extension pipes 50 can rotate in the first and second directions.

The link assembly 60 may include a locking device 62.

The locking device 62 may be provided in a manner that the rotation operation of the first or second extension pipe 51 or 52 can be restricted or released. The locking device 62 may restrict movement of the extension pipes 50 such that the extension pipes 50 may be spaced apart from each other by a predetermined angle. In more detail, the locking device 62 may restrict movement of the extension pipes 50 such that the extension pipes 50 can be fixed to any one of first, second, and third arrangements.

The locking device 62 may include at least one locking button 63 and at least one stopper 65.

The locking buttons 63 may be provided to be pressurized. One pair of the locking buttons 63 (i.e., two locking buttons 63) may be located at both sides in a width direction of the first and second extension pipes 51 and 52. In other words, one pair of the locking buttons 63 may be located at one side and the other side of the width direction of the first and second extension pipes 51 and 52. The locking buttons 63 may be pressurized in a direction perpendicular to the first and second directions. In other words, the two locking buttons 63 may be pressurized toward the center point of the width direction of the first and second extension pipes 51 and 52. The locking device 62 may include a locking elastic member 63a at a back surface of the locking button 63. As a result, the locking buttons 63 may elastically return in a direction opposite to the pressurization direction of the locking buttons 63.

The stoppers 65 may be pressurized by the locking buttons 63. One pair of stoppers 65 (i.e., two stoppers 65) may be provided to correspond to one pair of the locking buttons 63 (i.e., two locking buttons 63). The stoppers 65 may move toward the center point of the width direction of the first and second extension pipes 51 and 52. In other words, the pair of stoppers 65 may move toward the center point of the width direction of the first and second extension pipe pipes 51 and 52.

The locking device 62 may include a stopper receiver 68.

The stopper receiver 68 may be configured to include at least one stopper 65, such that the stopper receiver 68 may restrict the rotation operation of the extension pipes 50. In addition, when the stoppers 65 are separated from the stopper receiver 68, the extension pipes 50 may be rotatable.

The locking device 62 may include a rotation shaft 70 configured to interconnect the two stopper receivers 68 corresponding to one pair of the stopper receivers 68. The rotation shaft 70 may be configured to form the centers of the first and second extension pipes 51 and 52. The rotation shaft 70 may be arranged in the width direction of the first and second extension pipes 51 and 52. In other words, the rotation shaft 70 may be arranged in a direction perpendicular to the first and second directions r1 and r2.

The rotary shaft 70 may be spaced apart from the inner passages 51a and 52s of the first and second extension pipes 51 and 52. Alternatively, the rotation shaft 70 may not interfere with the flexible hose 53. Link structures of the extension pipes 50 may not interfere with the inner passages 51a and 52a formed in the extension pipes 50. In other words, although the extension pipes 50 rotate in the first and second directions r1 and r2 from the first arrangement 50a, such rotation of the extension pipes 50 may not affect the widths of the inner passages 51a and 52a. Through the above configuration, although the extension pipes 50 rotate in the first and second directions r1 and r2 from the first arrangement 50a, suction force of the suction motor 95 may not be affected by such rotation of the extension pipes 50, thereby cleaning the surface to be cleaned.

The stopper 65 may include at least one insertion protrusion 66 to be inserted into the stopper receiver 68. The stopper receiver 68 may include at least one reception hole 69 in which the insertion protrusion 66 is inserted. That is, the insertion protrusion 66 of the stopper 65 may be inserted into the reception hole 69 of the stopper receiver 68, such that rotation movement of the extension pipes 50 is restricted. In addition, the insertion protrusion 66 may be separated from the reception hole 69, such that the extension pipes 50 can rotate.

One pair of the insertion protrusions 66 (i.e., two insertion protrusions 66) may be provided. The two insertion protrusions 66 may be vertically spaced apart from the rotation shaft 70 by a predetermined distance. In other words, the rotation shaft 70 may be arranged to pass through a gap between the two insertion protrusions 66.

Each of the locking buttons 63 may include a locking protrusion 64 corresponding to the reception hole 69. Each locking button 64 may be disposed at an inner surface of the locking button 63. The locking protrusion 64 may be inserted into the reception hole 69.

The link assembly 60 may include a stopper seating portion 75 and a receiver seating portion 80.

The stopper seating portion 75 may extend from any one of the first and second extension pipes 51 and 52. The receiver seating portion 80 may extend from the other one of the first and second extension pipes 51 and 52. The stopper seating portion 75 may extend from the second extension pipe 52, and the receiver seating portion 80 may extend from the first extension pipe 51. However, the scope or spirit of the present disclosure is not limited thereto, and the stopper seating portion 75 may extend from the first extension pipe 51, and the receiver seating portion 80 may extend from the second extension pipe 52 as necessary.

The stopper 65 may be seated in the stopper seating portion 75. The stopper seating portion 75 may restrict movement of the stopper 65 in a pressurization direction of the locking button 63. In more detail, the stopper seating portion 75 may restrict movement of the stopper 65 in the width direction of the first and second extension pipes 51 and 52. That is, the stopper seating portion 75 may restrict rotation movement of the stopper 65. For this purpose, at least one stopper guide 77 formed in the width direction of the extension pipes may be provided in the stopper seating portion 75. The stopper 65 may include at least one guide groove 67 in which the stopper guide 77 is seated. The stopper guide 77 may be inserted into the guide groove 67, such that the stopper 65 may be provided to move in a formation direction of the stopper guide 77. The link assembly 60 may include a stopper elastic member 71 that allows the stopper 65 to elastically return in a direction opposite to a pressurization direction of the pressurization button.

The receiver seating portion 80 may be configured in a manner that the stopper receiver 68 is fixedly seated therein. The receiver seating portion 80 and the stopper receiver 68 may be integrated into one body. In the embodiment of the present disclosure, the stopper seating portion 68 may be fixedly seated in the receiver seating portion 80.

The stopper seating portion 75 may extend from any one of the first and second extension pipes 51 and 52, and the receiver seating portion 80 may extend from the other one of the first and second extension pipes 51 and 52. The stopper 65 arranged in the stopper seating portion 75 may rotate with any one of the extension pipes 50, and the stopper receiver 68 fixed to the receiver seating portion 80 may rotate with the other one of the extension pipes 50. In the embodiment of the present disclosure, the stopper seating portion 75 may be formed in the first extension pipe 51, and the receiver seating portion 80 may be formed in the second extension pipe 52. However, the scope or spirit of the present disclosure is not limited thereto, the stopper seating portion 75 may also be formed in the second extension pipe 52, and the receiver seating portion 80 may also be formed in the first extension pipe 51 as necessary.

The operations of the link assembly 60 will hereinafter be described with reference to the attached drawings.

Figure 12:
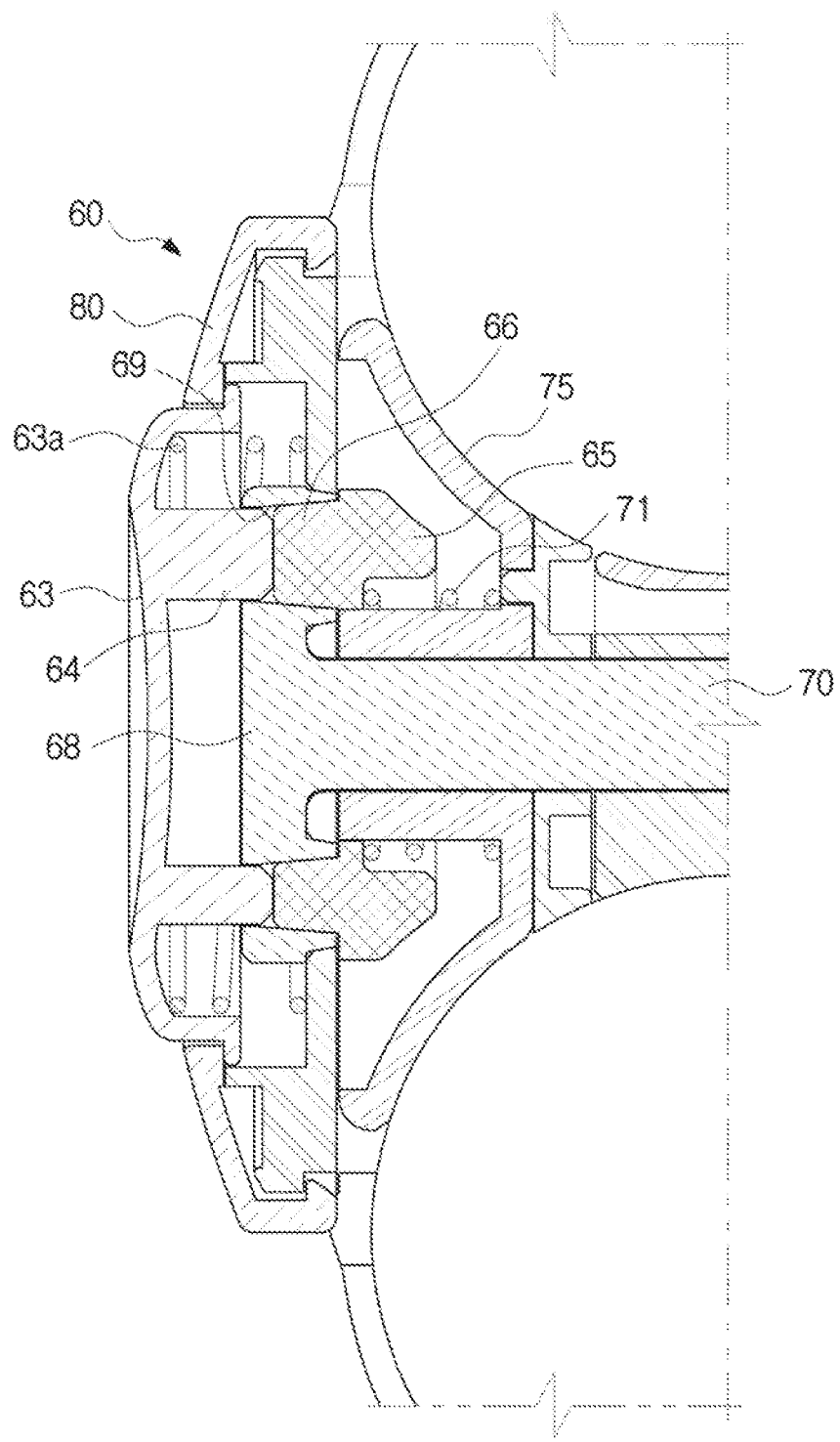
FIGS. 12, 13 and 14 are views illustrating operations of the link assembly of the cleaner according to an embodiment of the present disclosure.
Figure 13:
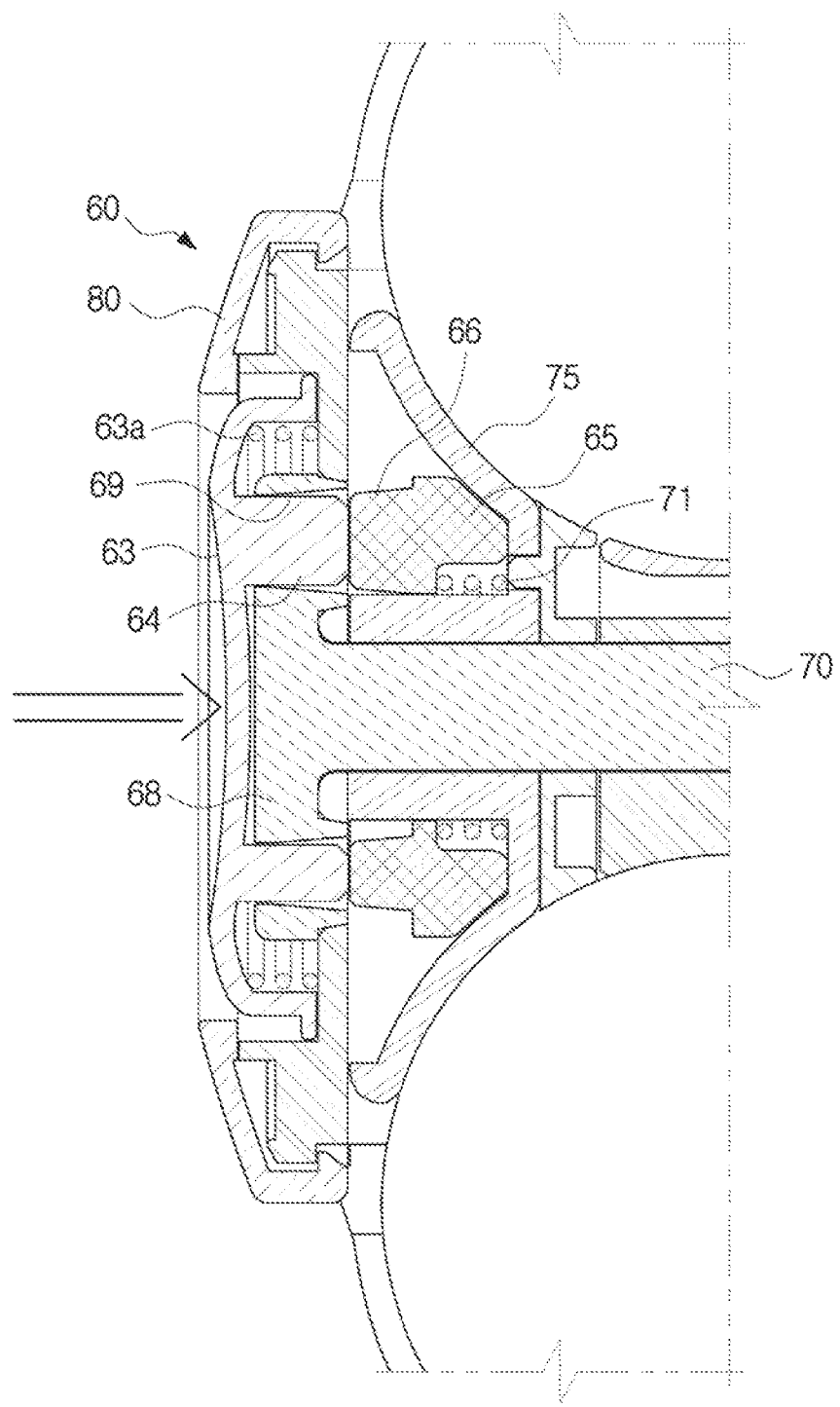
Figure 14:
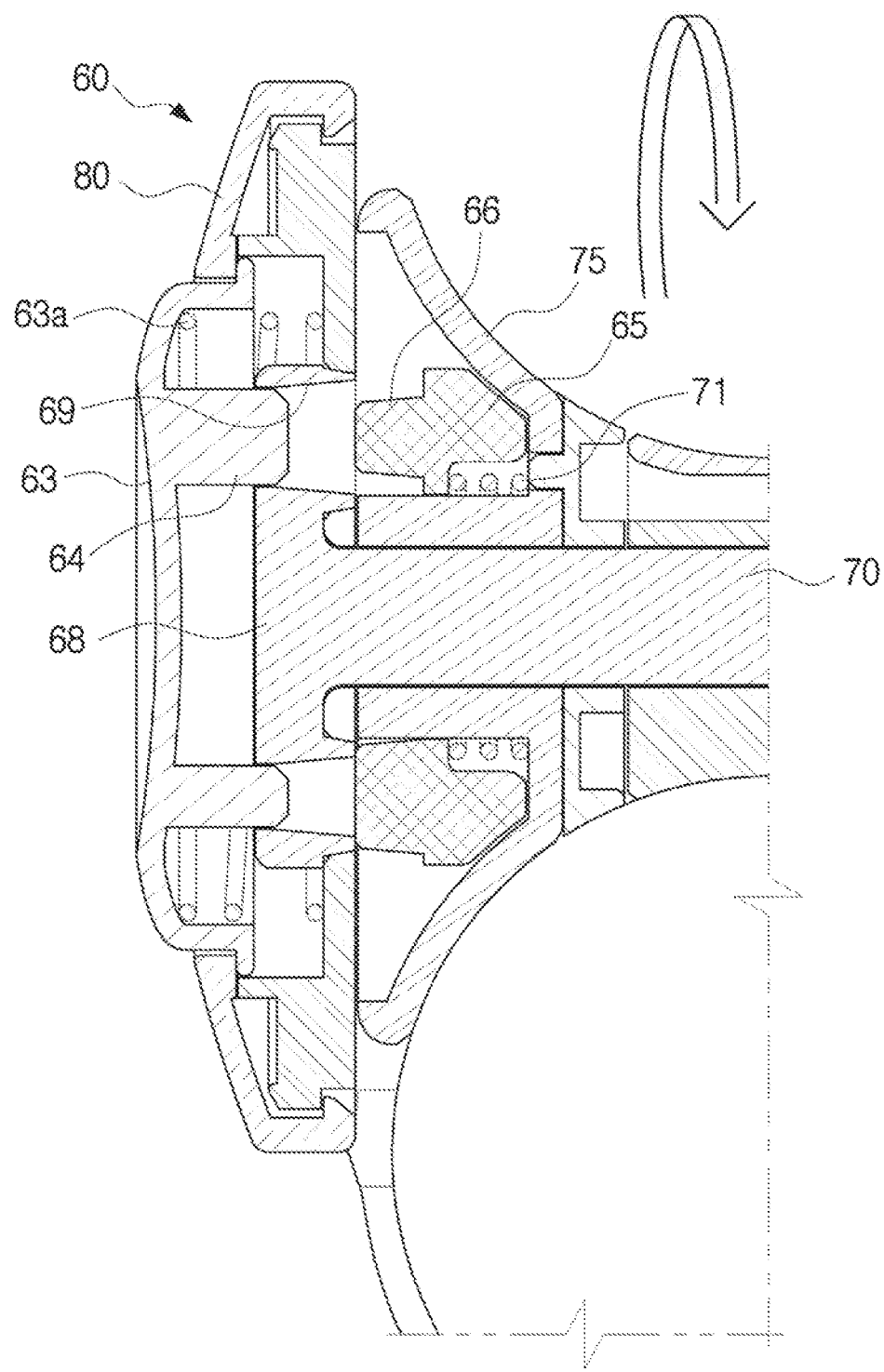

FIGS. 12, 13 and 14 are views illustrating operations of the link assembly of the cleaner according to an embodiment of the present disclosure.

Referring to FIG. 12, the insertion protrusions 66 of the stopper 65 of each of the first and second extension pipes 51 and 52 may be inserted into the reception holes 69 of the stopper receiver 68. By the above-mentioned structure, mutual rotation of the first and second extension pipes 51 and 52 may be restricted.

When the locking button 63 is pressurized as shown in FIG. 13, each pressurization protrusion of the pressurization button may be inserted into each reception hole 69, such that the insertion protrusions 66 of the stopper 65 may be pressurized. As a result, the stopper 65 may move toward the inside of the locking device 62, and may be separated from the stopper receiver 68, such that locking of the stopper 65 may be released from the stopper receiver 68. By the above-mentioned structure, locking of the first and second extension pipes 51 and 52 may be released, so that the first and second extension pipes 51 and 52 may be rotatable.

When the first and second extension pipes 51 and 52 rotate after the insertion protrusions 66 of the stopper 65 are separated from the reception holes 69, the insertion protrusions 66 may be supported by the inner surface of the stopper receiver 68 as shown in FIG. 14. In other words, when the first and second extension pipes 51 and 52 rotate, the insertion protrusions 66 may move along the inner surface of the stopper receiver 68. Locking of the insertion protrusions 66 may be released from the stopper receiver 68 and may remain released. As a result, the first and second extension pipes 51 and 52 may be rotatable.

Figure 15:
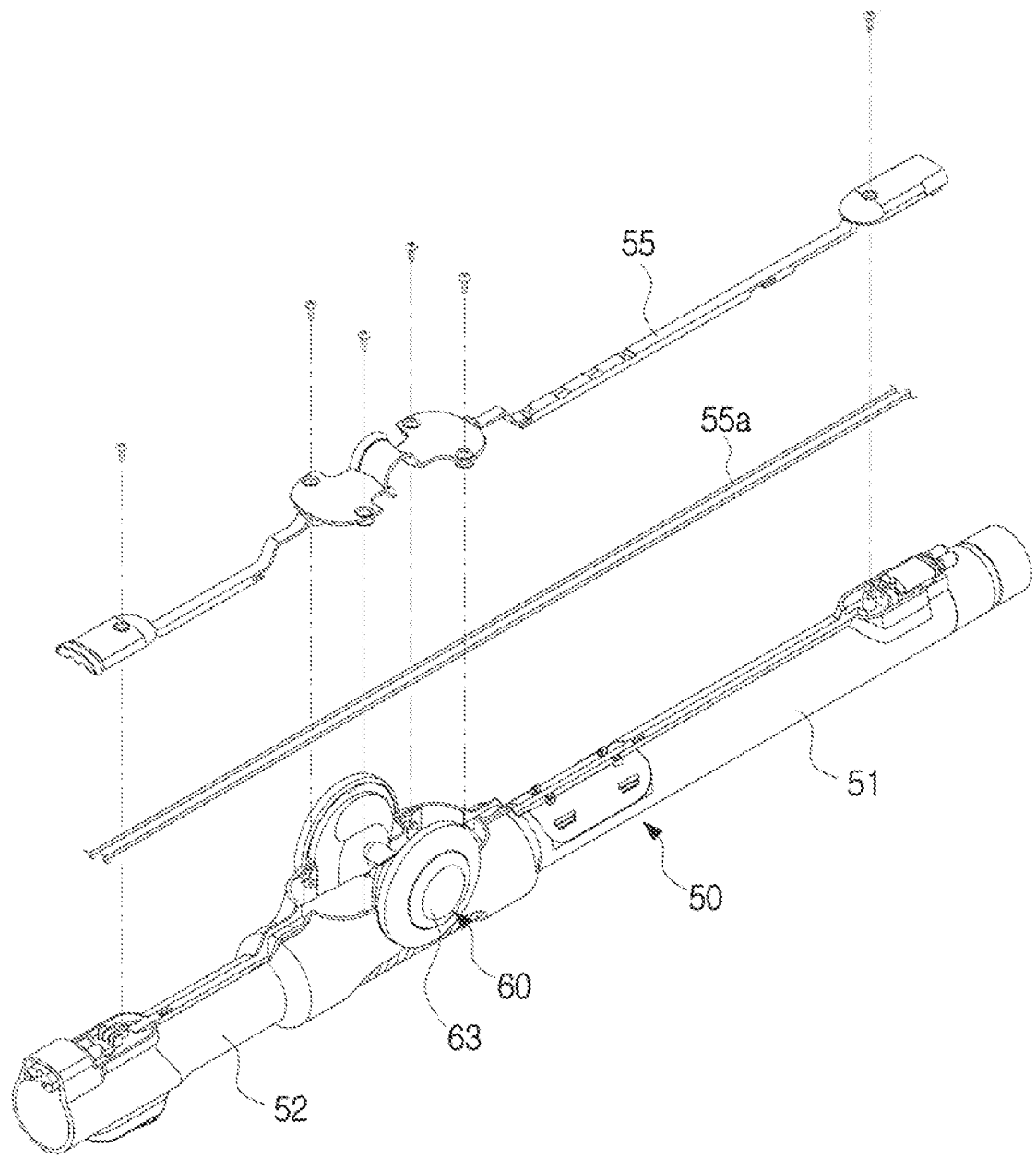
FIG. 15 is an exploded perspective view illustrating a wire cap of the cleaner according to an embodiment of the present disclosure.

FIG. 15 is an exploded perspective view illustrating a wire cap of the cleaner according to an embodiment of the present disclosure.

Referring to FIG. 15, the extension pipe 50 may include a wire cap 55.

The suction portion 40 may include a power brush (not shown) configured to receive a power source. In the case where the suction portion 40 is configured to receive a power source as described above, at least one wire 55a extending from the cleaner body 30 to the suction portion 40 may be provided at one surface of the extension pipe 50. The wire cap 55 may be constructed to cover the wire such that the wire 55a is not exposed outside. The wire cap 55 may be formed in the longitudinal direction of the extension pipe 50. The wire cap 55 may be installed to face the first and second extension pipes 51 and 52 disposed in the second arrangement 50b. However, the scope or spirit of the present disclosure is not limited thereto, and the present disclosure can also be applied to various modified structures in which the wire arranged in the longitudinal direction of the extension pipe 50 is not exposed outside.

Figure 16A:
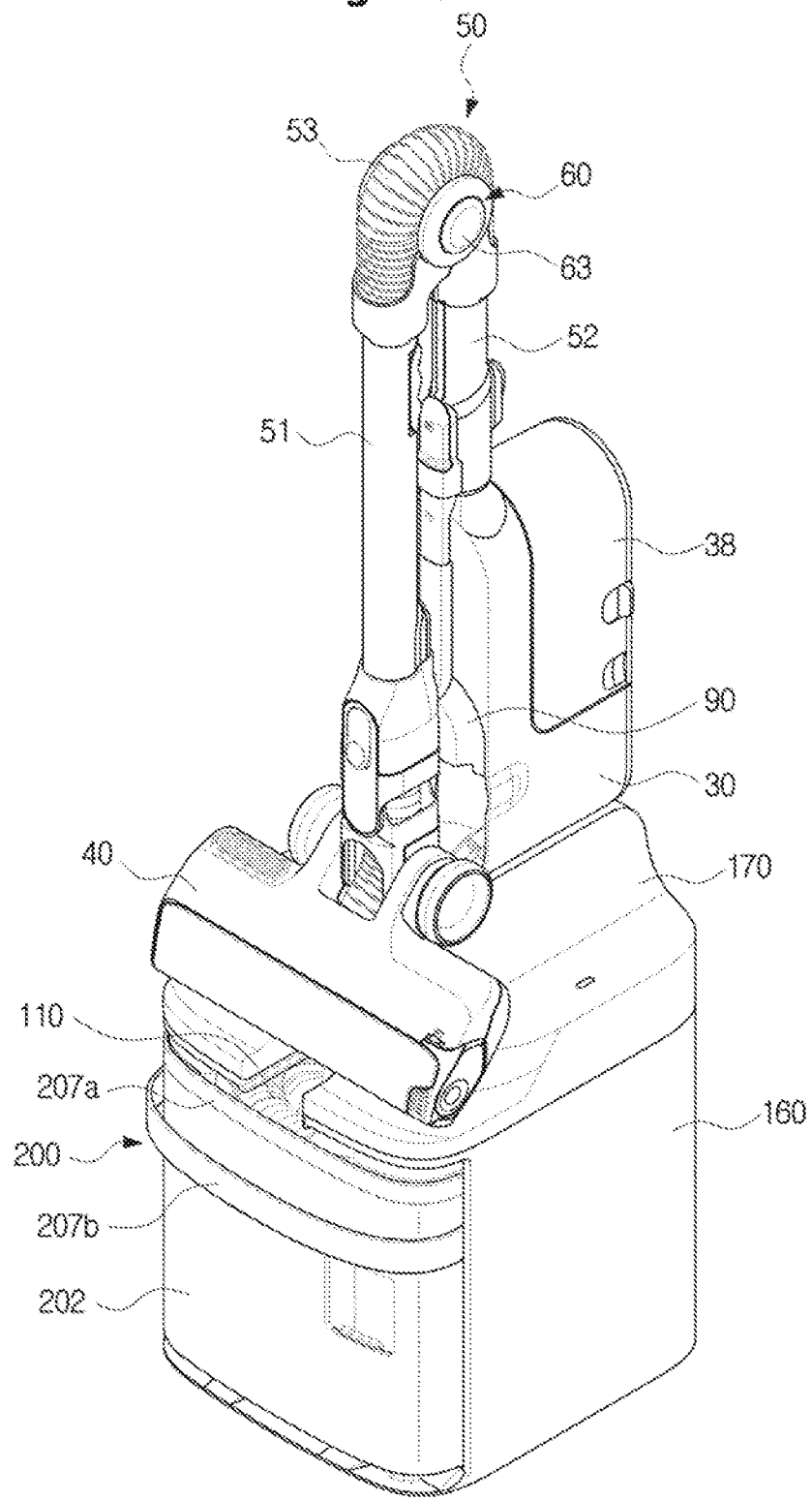
FIG. 16A is a perspective view illustrating a cleaning device according to another embodiment of the present disclosure.
Figure 16B:
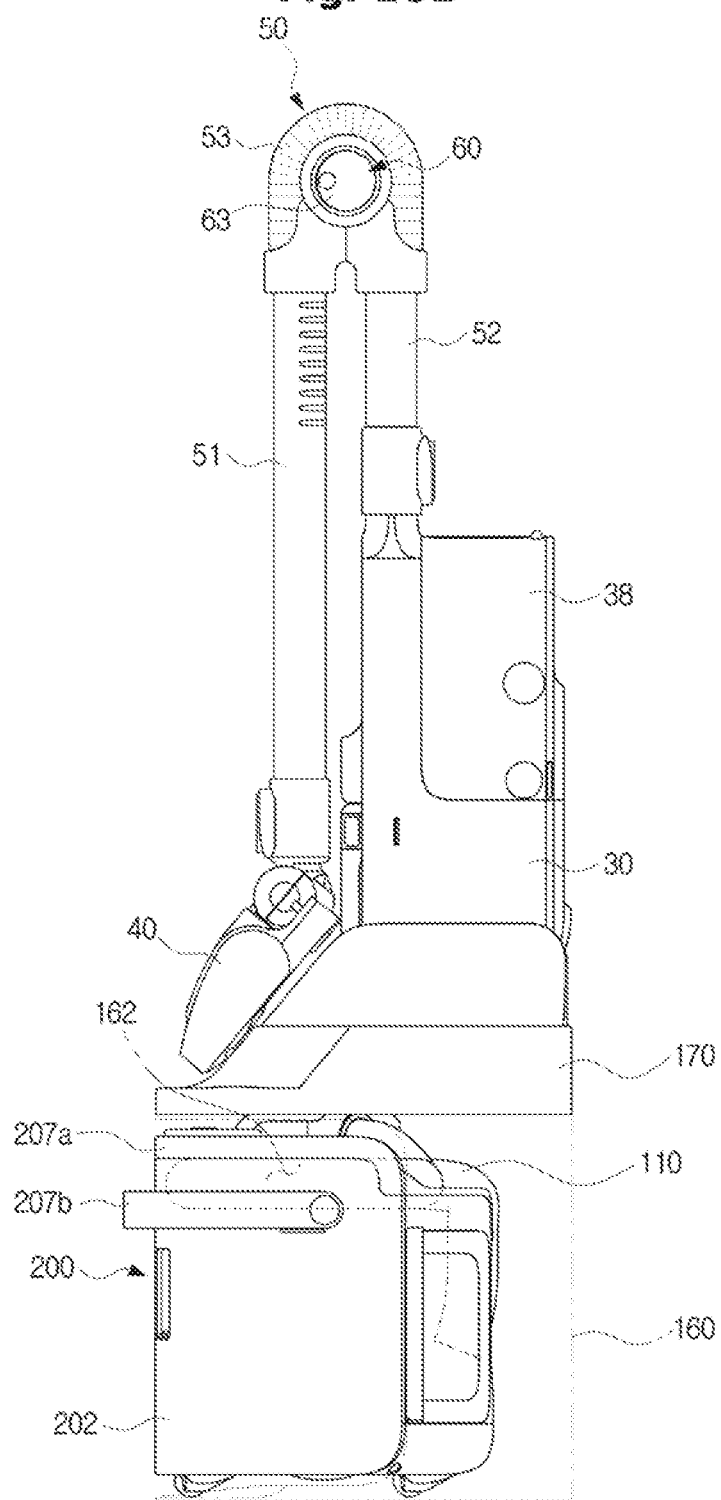
FIG. 16B is a side view illustrating the cleaning device according to another embodiment of the present disclosure.
Figure 17:
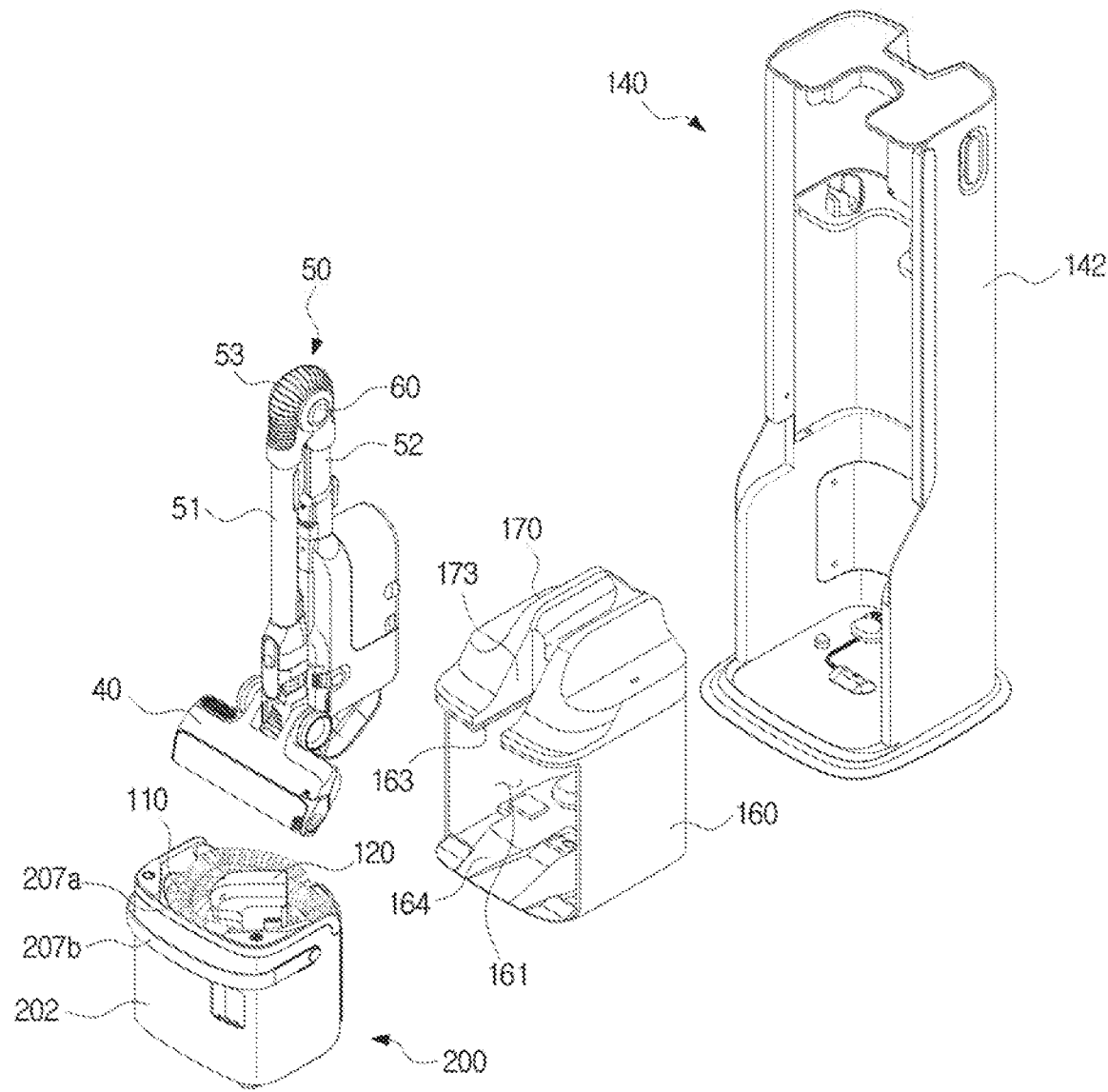
FIG. 17 is an exploded perspective view illustrating the cleaning device according to another embodiment of the present disclosure.

FIG. 16A is a perspective view illustrating a cleaning device according to another embodiment of the present disclosure. FIG. 16B is a side view illustrating the cleaning device according to another embodiment of the present disclosure. FIG. 17 is an exploded perspective view illustrating the cleaning device according to another embodiment of the present disclosure.

The canister 202 may include a sealed rib 207a provided at one side thereof. The sealed rib 207a may be provided at one side of the canister body. When the canister 202 is stored in the canister cabinet 160, the sealed rib 207a may be configured to cover the hose storage space 162. As a result, when the canister 202 is seated in the canister cabinet 160, the connection hose 110 disposed in the hose storage space 162 may not be exposed outside.

The canister 202 may include a canister handle portion 207b. The user may move the canister 202 by grasping the canister handle portion 207b.

Figure 18:
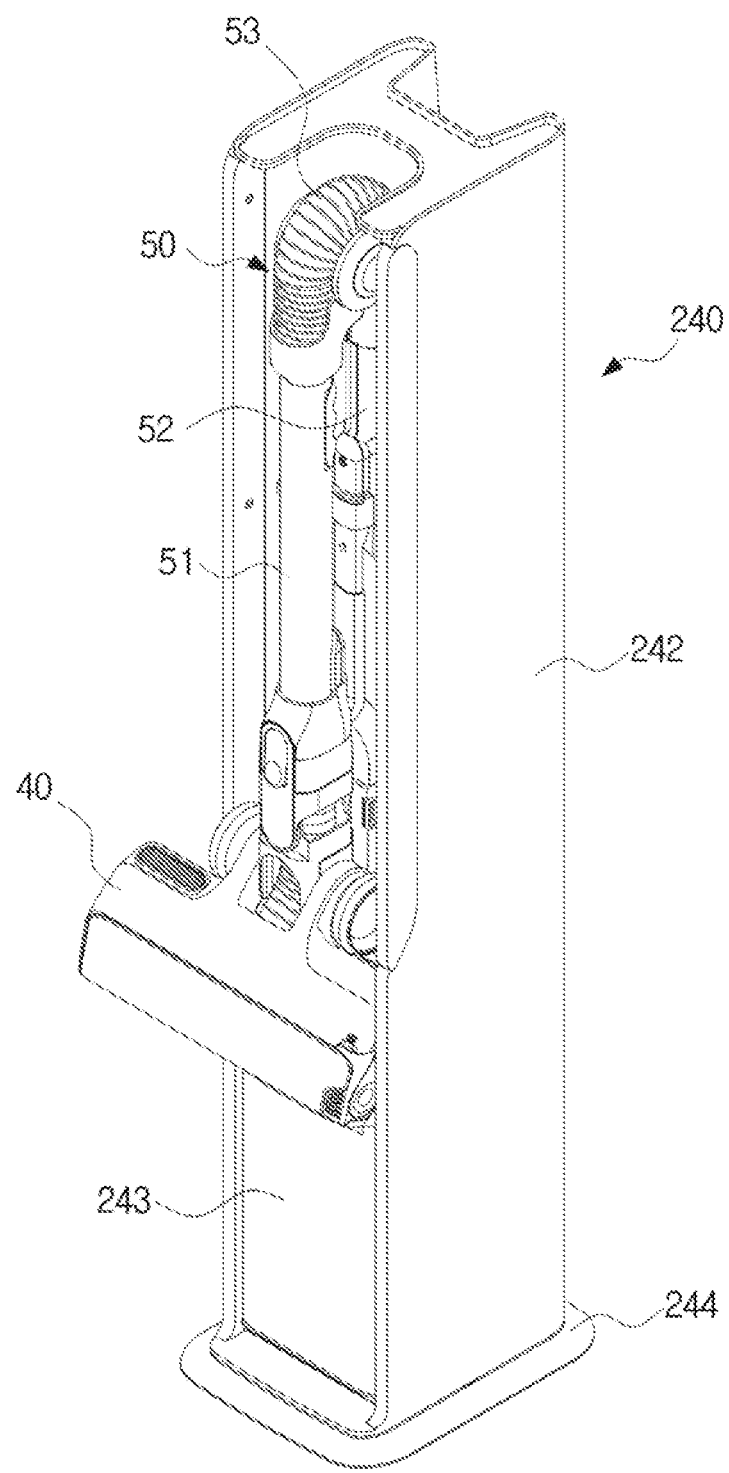
FIG. 18 is a perspective view illustrating a cleaning device according to still another embodiment of the present disclosure.

FIG. 18 is a perspective view illustrating a cleaning device according to still another embodiment of the present disclosure.

Referring to FIG. 18, a mounting station 240 may include a cabinet 242 forming the external appearance thereof, and may include a cleaner mounting portion 270 disposed in the cabinet 242. Alternatively, the mounting station 240 may include a storage box 243 to store various shapes of the suction portion 40 mounted to the cleaner 10.

The cleaner mounting portion 270 may be disposed in the cabinet 242, and may be detachably coupled to the cabinet 242. Although the cleaner mounting portion 270 is located over the storage box 243 for convenience of description, the scope of such arrangement location is not limited thereto.

Although the embodiments of the present disclosure have been disclosed for illustrative purposes, those skilled in the art will appreciate that various modifications, additions and substitutions are possible, without departing from the scope and spirit of the invention as disclosed in the accompanying claims.

The invention claimed is:
1. A cleaner comprising:
   a suction portion to contact a surface to be cleaned;
   a first extension pipe be connected to the suction portion contacting a surface to be cleaned; and
   a second extension pipe to be rotatably coupled to the first extension pipe;
   a cleaner body to be connected to the second extension pipe, and having a driver which generates suction force to suck objects contacted by the suction portion; and
   a link assembly, to rotatably couple the first extension pipe and the second extension pipe so that one of the first extension pipe and the second extension pipe rotates with respect to an other one of the first extension pipe and the second extension pipe, the link assembly comprising:
      a lock configured to restrict or release rotation of the first and second extension pipes, the lock comprising:
         a locking button including the locking protrusions, and configured to be pushed in a pushed direction by an external force;
         a stopper including insertion protrusions, and to be pushed by the locking protrusions when the locking button is pushed; and a stopper receiver having reception holes corresponding to the insertion protrusions, configured to allow the insertion protrusions to be inserted into the reception holes so that the rotation of the first and second extension pipes are restricted, or configured to allow the insertion protrusions to be released from the reception holes so that restriction of the rotation of the first and second extension pipes are released;

a stopper seating portion configured to extend from one of the first and second extension pipes, to allow the stopper to be seated therein such that movement of the stopper is restricted in the pushed direction; and a receiver seating portion configured to extend from an other one of the first and second extension pipes such that the stopper receiver is fixedly disposed therein, wherein the stopper, inserted in the stopper seating portion, is configured to rotate with the one of the first and second extension pipes, and the stopper receiver, fixedly disposed in the receiver seating portion, is configure to rotate with the other one of the first and second extension pipes, and wherein the first and second extension pipes are configured to operate in:
 a first arrangement configured to allow the second extension pipe to be arranged in a longitudinal direction of the first extension pipe, and
 a second arrangement configured to allow the second extension pipe to rotate in a first direction from the first arrangement such that the first extension pipe and the second extension pipe are arranged to face each other.

2. The cleaner according to claim 1, wherein the first and second extension pipes are configured to further operate in:
 a third arrangement configured to rotate in a second direction opposite to the first direction from the first arrangement.

3. The cleaner according to claim 1, wherein the pushed direction is perpendicular to the first and second directions.

4. The cleaner according to claim 3, wherein the link assembly further includes:

a stopper elastic member configured to allow the stopper to elastically return in a direction opposite to the pushed direction.

5. The cleaner according to claim 1, wherein assembly further comprises
 one pair of locking buttons, one pair of stoppers, one pair of stopper receivers, and
 a rotation shaft configured to interconnect the one pair of the stopper receivers as well as to form a rotation center of each of the first and second extension pipes.

6. The cleaner according to claim 5, wherein the rotation shaft is spaced apart from an inner passage of each of the first and second extension pipes.

7. The cleaner according to claim 5, wherein the one pair of stoppers includes:
 one pair of insertion protrusions vertically spaced apart from the rotation shaft, and inserted into the reception holes of the stopper receiver.

8. The cleaner according to claim 7, wherein the one pair of insertion protrusions is arranged in a direction perpendicular to a longitudinal direction of any one of the first and second extension pipes.

9. The cleaner according to claim 1, further comprising:
 a flexible hose provided between the first and second extension pipes so as to interconnect inner passages of the first and second extension pipes, and configured to have a variable length according to arrangements of the first and second extension pipes.

10. The cleaner according to claim 9, wherein the flexible hose is
 arranged in a longitudinal direction of each of the first and second extension pipes in the first arrangement.

11. The cleaner according to claim 1, wherein the locking protrusions includes a first protrusion and a second protrusion which is perpendicular to the first protrusion, and the reception holes corresponds to the first protrusion and the second protrusion so that the locking protrusions are configured to push the insertion protrusions through the corresponding reception holes when the locking button is pushed.

* * * * *